United States Patent
Coyle et al.

(10) Patent No.: US 11,202,144 B2
(45) Date of Patent: Dec. 14, 2021

(54) SOUND DIRECTING FRAMEWORK

(71) Applicant: Brian Michael Coyle, Canyon, CA (US)

(72) Inventors: Brian Michael Coyle, Canyon, CA (US); Alys Larsen, Canyon, CA (US)

(73) Assignees: Brian Michael Coyle, Canyon, CA (US); Alys Larsen, Canyon, CA (US)

( * ) Notice: Subject to any disclaimer, the term of this patent is extended or adjusted under 35 U.S.C. 154(b) by 0 days.

(21) Appl. No.: 16/741,663

(22) Filed: Jan. 13, 2020

(65) Prior Publication Data
US 2021/0014606 A1 Jan. 14, 2021

(51) Int. Cl.
*H04R 1/34* (2006.01)
*B60Q 5/00* (2006.01)

(52) U.S. Cl.
CPC ........ *H04R 1/34* (2013.01); *B60Q 5/00* (2013.01)

(58) Field of Classification Search
CPC ... H04R 1/34; B60Q 1/28; B60Q 5/00; G10K 11/08; G10K 11/26
See application file for complete search history.

(56) References Cited

U.S. PATENT DOCUMENTS 4,800,983 A * 1/1989 Geren ............... H04R 1/345
  181/141
7,130,430 B2  10/2006 Milsap
(Continued)

FOREIGN PATENT DOCUMENTS

KR  2013410 B1 * 11/2018  ............. H04R 1/345
KR  2013410 B1 *  9/2019  ............. H04R 1/345

OTHER PUBLICATIONS

Sklarz, M. & Miller, N., "The Impact of Noise on Residential Property Value," Collateral Analytics Research, Sep. 20, 2018.
(Continued)

*Primary Examiner* — Oyesola C Ojo

(57) ABSTRACT

An acoustic wavefront shaping device for altering the propagation of emergency siren sounds is provided. The device includes an enclosed framework containing sound channels mounted before a siren horn. The sound channels are positioned to partition the spherical wavefronts emitted by the siren and transmit each wavelet from the channel's entrance to exit into free space. The interior space of the sound channels contain acoustic macroscopic metamaterial structures that direct wavelet acoustic energy on meandering paths, which extend the transmission duration. Channels higher up in the framework, and away from the center, have straighter paths that transmit acoustic energy more quickly than other channels. The wavelets exit the channels at different times and reconfigure to form a wavefront that is squat and narrow, compared to spherical wavefronts. This wavefront expands into free space staying closer to the ground and closer to the center of the road than spherical wavefront expansion. The sound channels may be further configured with forced air currents to eliminate backscattering and eddies of acoustic energy flow, and the transmission duration of wavelets may be modified using temperature modification. Flexible macroscopic metamaterial structures can change shape in response to changing sound frequency to maintain wavefront shaping.

18 Claims, 19 Drawing Sheets

(56) References Cited

U.S. PATENT DOCUMENTS

| | | | | |
|---|---|---|---|---|
| 7,735,599 | B2* | 6/2010 | Kubota | G10K 11/025 |
| | | | | 181/192 |
| 8,616,329 | B1 | 12/2013 | Welter et al. | |
| 8,857,564 | B2 | 10/2014 | Ma et al. | |
| 9,352,817 | B2 | 5/2016 | Simon et al. | |
| 9,418,646 | B2* | 8/2016 | Daley | G10K 11/172 |
| 9,525,944 | B2 | 12/2016 | Clemen, Jr. | |
| 9,640,170 | B2 | 5/2017 | Cipolla et al. | |
| 9,762,994 | B2* | 9/2017 | Mathur | H04R 1/26 |
| 9,831,560 | B2 | 11/2017 | Driscoll et al. | |
| 10,043,508 | B2* | 8/2018 | Park | G10K 11/02 |
| 10,652,637 | B2* | 5/2020 | Zhao | H04R 1/345 |
| 2007/0258328 | A1* | 11/2007 | Zlotnik | G10K 15/04 |
| | | | | 367/139 |
| 2016/0157010 | A1* | 6/2016 | Oellers | H04R 1/02 |
| | | | | 381/89 |
| 2018/0130491 | A1* | 5/2018 | Mathur | H04S 7/307 |
| 2019/0260124 | A1* | 8/2019 | Davoyan | G01S 7/4817 |
| 2020/0304090 | A1* | 9/2020 | Urzhumov | H03H 9/0014 |

OTHER PUBLICATIONS

Liang, B., Cheng, J-C., and Qui, C-W., "Wavefront manipulation by acoustic metasurfaces: from physics and applications," Nanophotonics, 2018, 7(6): 1191-1205.

Li, J., Shen, C., Diaz-Rubio, A., Tretyakov, S.A., Cummer, S.A., "Systematic design and experimental demonstration of bianisotropic metasurfaces for scattering-free manipulation of acoustic wavefronts," Nature Communications, 2018, 9:1342-1351.

Ma, G. & Sheng, P., "Acoustic metamaterials: From local resonances to broad horizons," Science Advances, 2016 2:e1501595.

Au, W.W.L., Houser, D.S., Finneran, J.J., Lee, W-J, Talmadge, L.A., Moore, P.W., "The acoustic field on the forehead of echolocating Atlantic bottlenose dolphins (*Tursiops truncatus*)," 2010, Journal Acoustic Society America 128: 1426-1434.

Varanasi, U., Markey, D., Malins, D.C., "Role of Isovaleroyl Lipids in Channeling of Sound in the Porpoise Melon," Chemistry and Physics of Lipids, 1982, 31: 237-244.

* cited by examiner

SOUND DIRECTING FRAMEWORK

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Acoustic warning devices in the form of sirens are often mounted in or on emergency vehicles, especially ambulances, so as to emit high volume warning sounds to other motorists on surface roads, as well as pedestrians crossing them or nearby. These sirens also are used in or on police, fire, and other emergency vehicles. A common location for mounting sirens are along the top of a vehicle.

Emergency vehicle sirens are the one of the most frequently reported environmental complaints in cities. They emit a spherical soundwave pattern that spreads in all directions, reaching to residences and businesses in buildings alongside roadways. A siren sound's volume in a typical 5' floor residence, about 50 feet above the roadway surface, is generally louder than its volume at the next intersection along the roadway, given that many city blocks are 900 feet long.

It benefits urban society to have emergency vehicles that can travel at speeds adequate to meet emergency needs, which requires other cars on the same and nearby roadways as the emergency vehicle to have advance warning, which is produced using loud sirens.

It costs urban society if emergency sirens penetrate residential and business spaces, because sound can generate interpersonal conflict, disturb sleep, negatively affect cognitive functioning among children, cause physiological stress reactions, cardiovascular disease, hypertension, and stroke.

Since loud noises are a form of pollution, and pollution diminishes the value of living areas, people who own housing and business units near the roadway on which emergency vehicles travel suffer diminished property values. Numerous studies have found this. In one, property values in the Seoul area decreased by 0.53% for every unit increase in decibel noise. Ambulance and fire engine sirens have volumes of 130 db. Given ambient background of 30 db, a building unit near a roadway with frequent emergency vehicle transit may have a 50% reduction in value (Sklarz & Miller, 2018, 1.)

The cost in health and property value caused by emergency sirens is great. But the benefit of reaching a burning building or person suffering cardiac arrest in time to save the building or a life is almost inestimable.

U.S. Pat. No. 9,352,817 to Simon et al. (P1) has disclosed the concept of using sound emitters in a phased array on an emergency vehicle, to create a desired sound propagation pattern. '817 teaches the use of two or more sound emitters separated by a certain horizontal distance, each receiving a modified sound emission. Using the principal of phased arrays, '817 applies a delay to different small parts of the sound source, and sends each part to a different sound emitter, such that the sound wave will sum constructively along a desired direction.

Such as system is not suited for mounting on the surface of a vehicle. Emergency sirens use a sound pattern that alternates low and middle frequencies, between 500 Hz and 4000 Hz. A phased array emits an acoustic wavefront from each emitter. Lower frequencies have larger wavelengths that expand spherically from the emitter. If placed closer together than about three times the wavelength diameter, side lobes of considerable strength form. Even when emitters are spread optimally, the concentrated sound in the desired direction is limited. 50 or more emitters may be needed, spread apart widely, which require active electronic control of phase and amplitude distribution to direct a sound front. The setup is impossible to fit on a vehicle.

As frequencies increase, the distance between sound emitters in a phased array must shrink. Otherwise high frequency central lobed veer off in a sideways direction. This is an artifact of emitter size. High frequencies are invariably smaller diameter wavelengths than emitter horns, so they initially form beam shaped signals, rather than spherically expand. This interacts with phase delayed signals to generate a widely spreading sound envelope.

Acoustic waves emitted by sirens are 20 centimeters or less in length. High frequency wavelengths are under 10 centimeters. A typical emergency siren horn is over 40 centimeters wide. It is physically impossible to configure multiple horns side by side so that they are separated by less than half their emitted wavelength.

Deploying less than ten sound emitters in phased array will focus sound over a limited focal length of less than a meter. At distances beyond this the sound moves omnidirectionally. Using very large sound emitters, ten sound emitters in a phased array can focus as far in the distance as the measured width of the source array. For obvious reasons this is inconsequential for an emergency vehicle.

Further, to be effective the phased array must precisely send sound parts to different sound emitters at exact times. Since an emergency vehicle is moving, constantly accelerating and decelerating, this will make criteria used for precision phasing too data intense for on-board processing.

U.S. Pat. No. 7,130,430 to Milsap (P2) teaches a correctly configured phased array sound system. Claim 4 specifies that more than 100 speakers are necessary to produce directional sound using the phased array.

In effect these are problems of generating a shaped wavefront by modifying component waves. If a device modifies wavelets of all component waves of a wavefront simultaneously, the problems of interacting waves greatly diminishes.

An emergency vehicle gets no benefit from the sound heard by residences and businesses alongside the roadway. These residences and businesses suffer direct and indirect costs. Accordingly, it would be desirable to operate such acoustic warning devices in a manner that limits the sensory impact alongside the roadway, particularly in multistory buildings near the roadway. To that must be added that the device should be practical, fitting within a reasonable area of an emergency vehicle roof. It should not demand software development that may be difficult to create, in order to adjust to variable vehicle speeds. Therefore a device that modifies wavelets of acoustic wavefronts is needed.

Acoustic metamaterials and metasurfaces provide a possible means to control emergency siren sound direction.

Scientific research into these materials only began in the 21$^{st}$ century, but knowledge has sufficiently advanced to permit novel, unanticipated configurations to solve acoustic problems.

Acoustic metamaterials and metasurfaces are engineered materials that contain that generally have a shape and size smaller than a soundwave (Liang et al., 2018, 2.)

Metamaterial usually have impedance values of density and/or bulk modulus that modify sound. This is accomplished with composite materials. Composites with negative dynamic mass density can attenuate or completely reflect sound (Li et al., 2018, 3.)

Ordinarily, if a sound wavefront passes from medium A into medium B, and medium B's density is more than A, medium B's bulk modulus is also greater. Although there's more medium B structure for acoustic energized particles to traverse, the high bulk modulus energetic molecular bonds allow acoustic energy to greatly accelerate. Sound moves faster in dense material, but it's amplitude greatly attenuates.

But if medium B has higher density but, conversely, a lower bulk modulus, or a higher bulk modulus and lower density, than neighboring media, a sound wavefront will be reoriented. If there's more dense structure for acoustic energy to traverse, but there's less molecular bond energy to permit it, sound waves decelerate and change direction. If there's less density, but more molecular energy, sound simply may not penetrate from the neighbor medium. These metamaterial conditions are usually achieved under some form of resonant condition, and can be limited in bandwidth and lossy.

Acoustic metasurfaces are engineered materials that contain of specific shapes. Acoustic waves are much larger than optical wavelengths. Structures much smaller than an acoustic wave may be easily manufactured. Metasurface objects correlate physical geometry and acoustic properties: parabolic cylinders concentrate soundwaves towards a line, spherical shapes concentrate soundwaves towards a point, and arbitrary geometry objects may lead to unusual acoustic effects. Metasurfaces contain that act as short waveguides, which locally impose phase shifts and reflections on (Ma & Sheng, 2016, 4.)

U.S. Pat. No. 8,616,329 to Welter et al. (P3) teaches an acoustic lens made of concentric rings to focus sound in a circular spot in air. The embodiments use ultrasound. The design is intended for medical use. U.S. Pat. No. 9,640,170 to Robertson (P4) discloses an acoustic wave steering material that uses metamaterial structures to create an underwater acoustic cloak. A preferred embodiment uses hexagonal cells stamped out of metal, with inwardly protruding lobe shapes, that mimic the sound refraction properties of water.

U.S. Pat. No. 8,857,564 to Ma et al. (P5) discloses a tubular, close-ended structure that modifies density and bulk modulus of an enclosed fluid, thereby modifying sound that enters. It is intended for experimental use.

U.S. Pat. No. 9,831,560 to Driscoll et al. (P6) teaches what is called a metamaterial that reflects electromagnetic waves within a device to minimize scattering. Only one image and design is provided, using mirrors. This appears to be a kind of improved light pipe, not a metameterial based on modifying wave properties. Waves are noted intos.

U.S. Pat. No. 9,525,944 to Clemen, Jr. (P7) teaches an acoustic metamaterial to dampen sound, by digitally processing an incoming sound waveform and generating, in a sound production device, a sound that, when combined with the original waveform, modifies it. It's intended to attenuate sound from aircraft, by applying the method of noise-cancellation headphones to open-air sound. U.S. Pat. No. 9,418,646 to Daley & Reynolds (P8) also discloses a metamaterial to attenuate sound volume, by modifying density and bulk modulus of the material to be negative using Helmholtz resonators.

Metamaterials are typically used to attenuate and hyper-focus sound. To permit emergency vehicles to reach destinations as quickly as possible, while reducing acoustical sensory impacts in areas in buildings alongside and above the roadway, a metamaterial structure is needed in a practical format that fits on an emergency vehicle and can shape broadband acoustic wavefronts to expand primarily on the ground, without deploying overly complex software to adjust acoustic output at variable vehicle speeds.

SUMMARY OF THE INVENTION

It is an object of the present invention to protect the aural sense of people who live, work, and shop in buildings alongside urban roads on which emergency vehicles travel and emit high volume siren signals. The invention also protects the safety of roadway vehicle drivers and passengers, and pedestrians, who must receive adequate acoustical warning of emergency vehicle movements.

This invention will enable emergency vehicles to continue to emit loud siren sounds that warn other vehicles on the roadway and nearby pedestrians of their approach, while protecting the well-being of people in buildings near the roadway, and improve the value of building property.

In warm air, sound travels up to 360 m/s, while in cold air it may travel 30 m/s slower. If a sound wavefront wavelet closer to cold ground travels at 330 m/s, and another in a warm sky travels at 360 m/s, the faster wavefront travels 30 meters further in one second. Because of inertial forces, the upper part of the wavefront will "bend down" towards the lower one. The wavefront is no longer heard in upper stories of buildings alongside. If a wavelet of a wave travels a path at 360 m/s, but the path has 30/360 more length than others, and this extends over at least ½ the length of the frequency wavelength, at the path's output the wavelet has an equivalent position as sound energy traveling 30 meters more slowly. As the multiple wavelets reconfigure in the acoustic wavefront, faster, higher wavelets will "bend down" towards the slower one. This shape continues as it expands into the far field, so that the sound siren is not heard in tall buildings alongside the road.

This logic is applied in the current invention, using metasurfaces, metamaterials, forced air, temperature changes and other acoustic energy directing solutions.

Macroscopic metamaterial structures in channels create winding and labyrinthine passageways for wavelets to transit, increasing transit time prior to exiting at the far end. This causes wavelets to be functionally decelerated, changing their apparent velocity.

Sound volume reduces with distance, as the inverse square of the range, in the case of a source radiating sound in all directions. The energy of the sound traverses the area of a sphere, $4\pi r^2$. If the sound is constrained in a cylinder, it traverses an area in which r is equal to length and H is height, $2\pi rH$. Since volume attenuation is equivalent to the area traversed, less occurs in a cylinder. In this invention a wavefront expansion may be constrained to the cylindrical dimensions of acoustic macroscopic metamaterial channels.

The method for directing siren sound in front of an emergency vehicle on the roadway, and not to the side or above, is inspired by the aquatic cetacean mammal order, in particular the porpoise family, of which there are seven closely related species. Porpoises use echolocation as their primary sensory system. They generate high frequency clicks in an area behind their head. These sounds are directed forward through an organ known as a melon, composed of various fats. Lipids of various densities are distributed in an almost checkerboard like pattern of blocks in the melon. Higher density blocks near the melon's center slow down acoustic wavefront wavelets more than lower density blocks near the melon's sides. Upon exiting the melon, the wavelets collectively reassemble an acoustic wavefront that refracts around the middle area. This creates a wavefront that, though it expands in the water, retains a focused shape (Au, 2010, 5.) The cetacean melon is a natural metamaterial product. While some define metamaterials as "not observed in nature," the cetacean melon shows this is clearly not the case.

A wavefront whose shape is distorted as it is broadcast retains the distorted shape in the far field, after expansion. This natural system illustrates a mechanism for an emergency siren acoustic wavefront to remain close to the roadway and not expand into buildings alongside and above the road.

Porpoises emit high frequency, low-volume sounds that are heavily attenuated by the dense melon, as well as shaped by it. An emergency vehicle siren emits acoustic wavelengths that must maintain loudness. Instead of slowing wavelets with dense material, this invention uses sound channels that contain either components or temperature controls. Macroscopic metamaterials in channels reduce the apparent velocity of wavelets by lengthening transmission paths. Acoustic energy is maintained with metamaterial designs, construction, and the input of accelerated air flow. Alternatively, sound channel temperature may be modified, thereby decelerating (cooling) or accelerating (heating) wavelet transit time.

This invention deploys a framework which, like the porpoise melon, contains an array of different sound channels with different wavelets transit times, thereby shaping the acoustic wavefront that emerges, so that it has a desired shape which propagates near the ground.

In the current invention, a wavefront shaping structure is a stand alone device positioned inside or outside the mouth of an emergency siren, or it may be mounted directly to the siren, or manufactured as part of the siren. The structure transmits acoustic wavefronts through it, partitioning the wavefront into wavelets that pass through sound channels. Each channel modifies the apparent wavelet velocity. Velocity modification is produced in at least two different ways. In the first way, macroscopic metamaterial structures direct a wavelet in a meandering channel, with minimal loss of acoustic energy (sound volume.) The meandering channel, being an indirect path between the input and output ends of the channel, takes more time for the wavelet to traverse. Upon exiting sound channels, all wavelets reform the wavefront. The wavelets that traversed longer paths exit later than others. This causes the wavefront to bend in the direction of the later arriving wavelets. This modifies the expanding shape of the wavefront. If lower sound channels meander more than higher channels, the wavefront will "bend down" and sound will be directed in front of the vehicle on the roadway, and not above the roadway. If sound channels close to either side of the wavefront shaping structure meander less than sound channels close to the center of the structure, wavelets, upon exiting sound channels, collectively reassemble into a wavefront that bends toward the middle. This modifies the wavefront's expanding shape so that sound will not be heard to the sides.

Because wavelets that are redirected more on meandering paths may encounter more vortices and other frictive forces that dilute acoustic energy, an air pump can either push or pull the air in these refractive channels to break-up and overcome dissipative eddies of acoustic energy. Macroscopic metamaterials may be made with interleaved materials with different sound propagation velocities, to yield a surface that prevents sound absorption, back-scattering, and dispersion.

The second way to reduce the apparent velocity of wavelets in sound channels is temperature. By chilling different sound channels to different reduced temperatures, wavelets transiting through them will slow to different degrees. It is also possible to use heat, which makes wavelets travel faster. It may prove convenient to use cooling or heat depending on ambient temperature. During the summer, for example, it may be more convenient to control velocity through chilling lower and central sound channels. During the winter, heating higher sound channels, and those near the wavefront shaping structure's sides, may be more efficient.

A modified form of the first way to modify apparent velocity is to shape the acoustic wavefront as a whole. Macroscopic metamaterials extend from the bottom to the top of such a framework, shaped to slow acoustic energy velocity more in some places than others. Macroscopic metamaterials can even be shaped to modify different frequencies. Alternatively, a macroscopic metamaterial can be reshaped in real time, to match the changing frequencies emitted by the associating sound emitter.

Thus vehicles and pedestrians on the roadway will have adequate warning to respond to the emergency vehicle, while people in buildings alongside and above the roadway will not hear a loud siren noise. This invention could have different patterns of sound attenuation for different urban and regional landscape and building configurations. It may also be used for non-emergency vehicle horns, which are also problematic in urban areas.

Macroscopic metamaterials of cylindrical convex parabolic shape can reflect wavelets in a preferential direction. The curved upper and lower edges concentrate acoustic energy towards the middle of the channel. If the macroscopic metamaterial shape ends with a tapered edge, acoustic energy moves in that direction.

Macroscopic metamaterials may be decorated with sinusoidal undulations of regular or varied spatial density. These selectively alter the turbulent boundary layer to generate a "ball bearing" effect of small vortexes, permitting the acoustic energy to flow smoothly onward.

Surface decorations may include placoid shapes, hierarchical topographic shapes, fractal shapes, rotational invariant designs, parabolic waves, linear patterns, and wavy-wall effects. These shapes and others like them may be used to maximize the coherent directed reflection of acoustic energy from macroscopic metamaterials, so acoustic energy is conserved and the wavelet travels a predetermined route with minimal friction.

Macroscopic metamaterials to direct acoustic waves can be constructed from materials with maximum stiffness and minimal damping. Structural metals such as steel, brass and aluminum alloy combine these properties, as do ceramics.

Although such stiff materials reduce absorption to 3% or less, under certain circumstances a series of macroscopic metamaterials constructed from such material will have an aggregate volume attenuation of 20%. This may or may not be problematic. If it is, macroscopic metamaterials may be constructed with close to 0% absorption. These may be manufactured from combinations of high-density structural metals containing thin seams or layers of low-density material like rubber or silicon. Unless the acoustic energy strikes such a metamaterial within a narrow incoming angle range, it will reflect all the acoustic energy. The macroscopic metamaterial must be shaped to avoid the possibility of incoming acoustic energy striking within the narrow angle range.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION

Figure 1A:
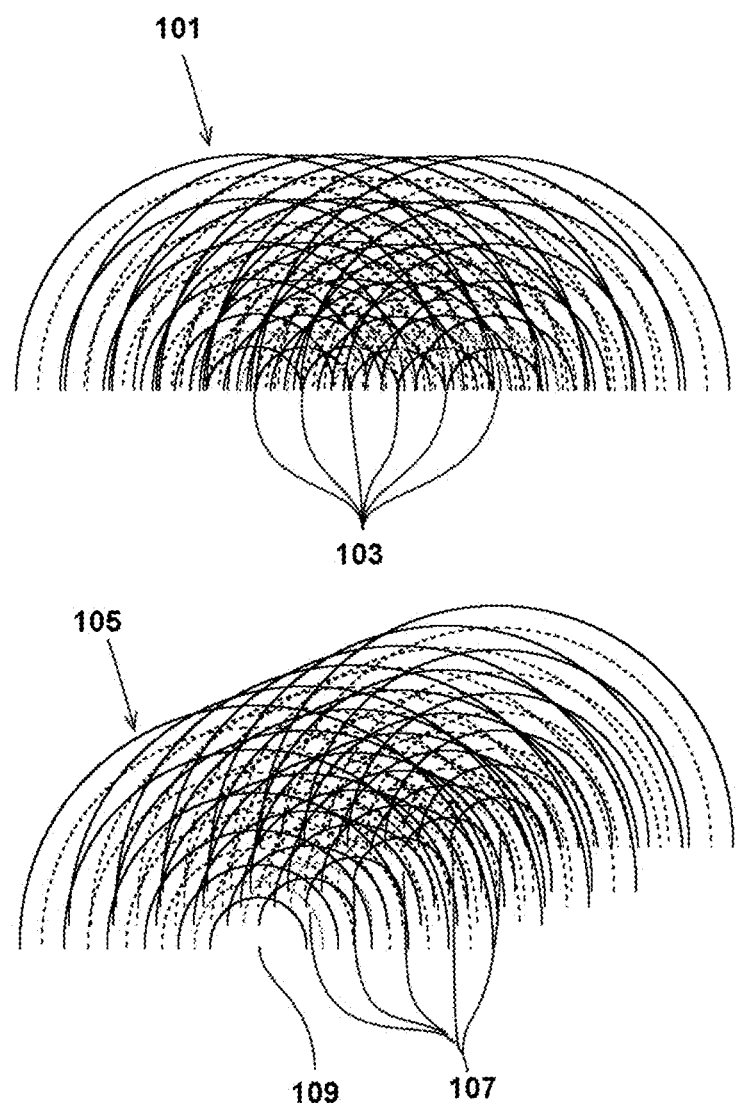
FIG. 1a is a schematic representation of acoustic wave direction shifting.

A core principle of this invention may be seen with reference to FIG. 1a. Sound wavefronts may aggregate into shapes that modify directionality. This can occur by dividing a single wavefront into wavelets and recombining them, or by combining multiple wavefronts. In either case a core principle is to delay one or more wavelet or wavefront prior to aggregation. Illustration 101 shows the simultaneous emission of sound wavefronts 103 by six parallel emitters. These combine to form a uniform wavefront moving directly forward. In illustration 105 each successive wavefront 107 to the right of the initial wavefront 109 is delayed. The aggregated wavefronts have a different shape, which will expand in a direction offset from directly forward.

Figure 1B:
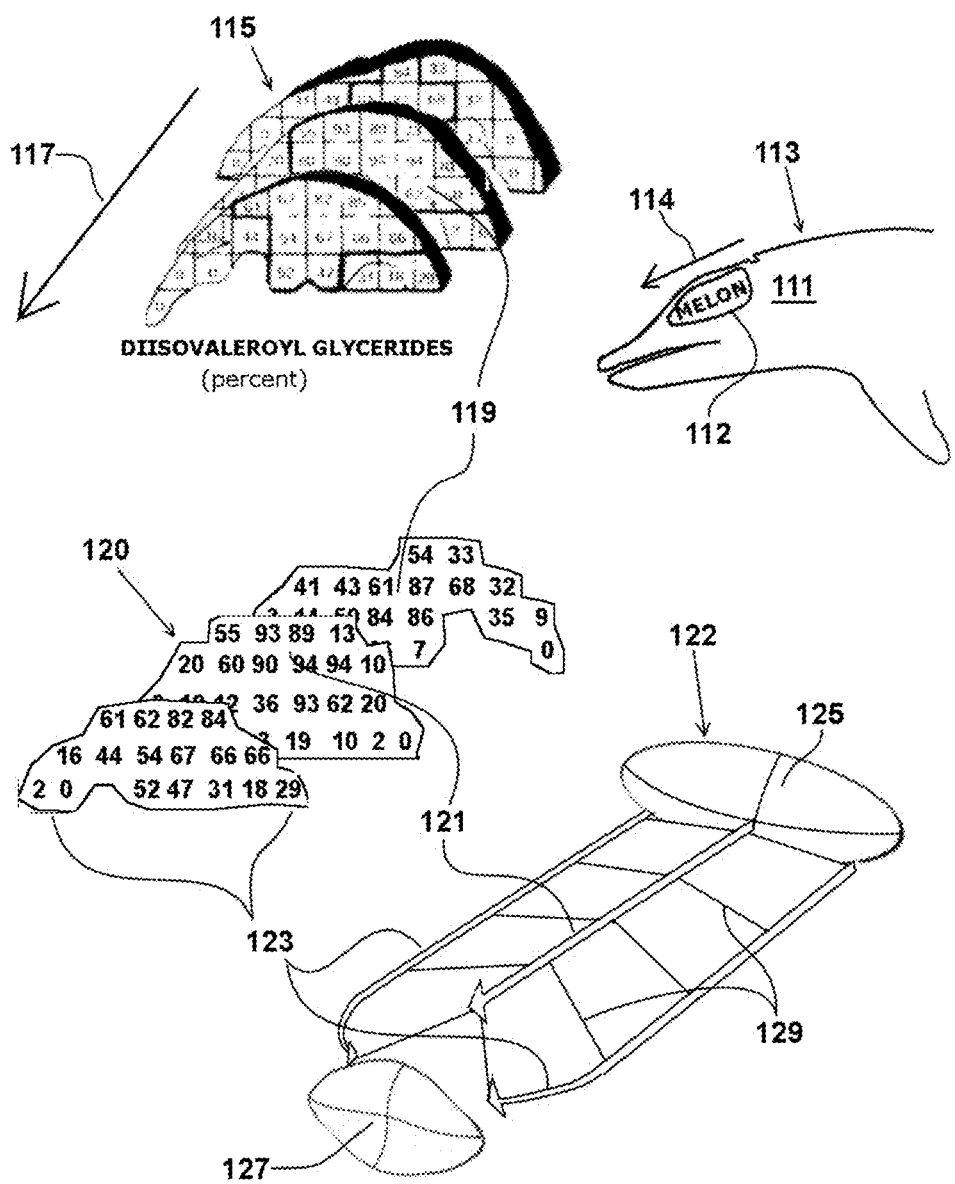
FIG. 1b contains drawings used to explain how the porpoise echolocation sound system works.

FIG. 1b illustrates a biological example of the principle (Varanasi et al, 1982, 6.) This invention is inspired by the method porpoises use to detect and track prey, echolocation. Porpoise 113 has sound source behind the head 111, which emits through the head. A multiphase structure called a melon 112 in the porpoise forehead enables the porpoise to manipulate the directional acoustic field. Research using computed tomography derived the multiphase (bone-air-tissue) complex of the porpoise forehead. Tissue experiments obtained gradients and density of melon tissue. Sound velocity modification within the melon is determined by the lipid content of its sub-units, more precisely the percent of diisovaleroyl glycerides. The higher the percent of lipid, the more a is decelerated. In illustration 115 slices of the porpoise melon are shown, with subdivisions marked one each, and percent of diisovaleroyl glyceride 119 noted. Arrow 117 shows the melon orientation towards the front of the porpoise head, as does arrow 114 in the porpoise 113 illustration.

Illustration 120 shows the percent of diisovaleroyl glyceride 119 clearly. Percentages decrease towards the right and left sides of each slice 123, and towards the bottom. These melon sections decelerate wavelets less than the upper middle of the melon 121. This causes the wavefront shape to compress and flatten. This process is shown in illustration 122. Pre-transmission wavefront 125 enters a domain in which wavelets of the soundwave travel at different velocities. The center of the wavefront 121 travels slowest, and sides 123 fastest. When the wavelets aggregate they form a smaller, flatter post-transmission wavefront 127. Bars 129 between 121 and 123 show the progressive change in the wavefront structure.

Figure 1C:
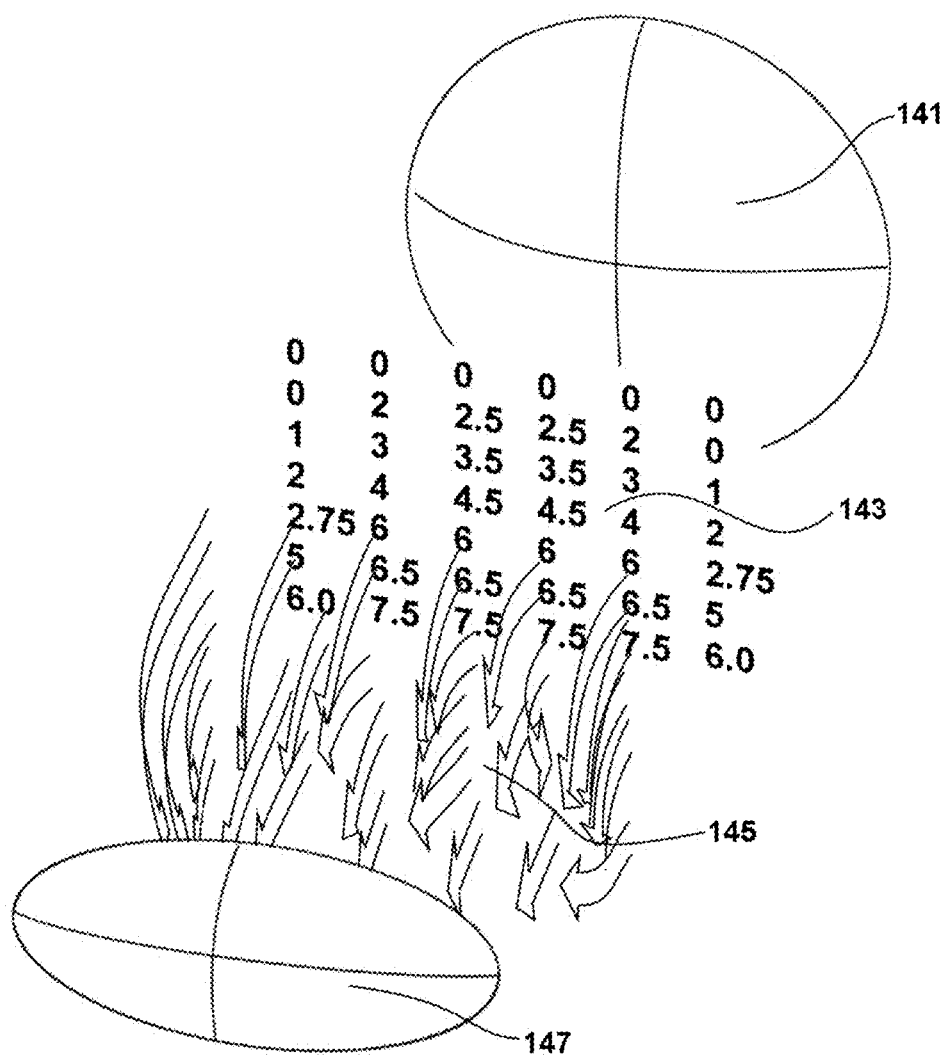
FIG. 1c applies the porpoise process to emergency siren needs.

FIG. 1c depicts process of this patent. In accomplishing the restriction of wavefront expansion to the land surface, it is necessary to feed a pre-transmission acoustic wavefront such as 141 into a matrix of passages simultaneously, sub-dividing the wavefront into wavelets, the number being unlimited, but often between 12 and 48. These wavelets may be considered to be portions of a single acoustic wavefront. The different lipid blocks in FIG. 1b decelerated wavelets to different degrees, thereby altering the shape of the single acoustic wavefront. In FIG. 1c the array of numbers 143 simulates a matrix of passages that each decelerate a wavelet. Numbers range from 0, which defines no deceleration, to 7.5, the most.

Upon exiting the mechanism simulated in 143, wavelets are pulled into a new shape of post-transmission wavefront 147, as the separated strands of acoustic energy converge 145. Instead of a spherical wave 141 expanding in all directions equally, including to elevations many stories above the ground, post-transmission wavefront 147 expands in a vertically compressed manner. If the wavefront is an emergency siren, this accomplishes the simultaneous goals of warning pedestrians, drivers, and others near the ground, and not impacting residents in floors of buildings above ground level.

The functionalities produced by the sound directing device (the invention) are due to sound channels that extend the duration of wavelets transiting through them. The sound channels contain generally non-resonant metamaterials to lengthen the acoustic energy propagation path.

Macroscopic metamaterial structures arrayed in a sound channel may be defined by a coiling coefficient $\eta$. $\eta = P/L$, where P is the length of the meandering path inside the channel, and L is the side length along the channel.

An inexact estimate of the refractive index of the sound channel is $n_{\mathit{eff}} \approx \eta - (2\pi c/\omega L)$ where c is the speed of sound (343 ms$^{-1}$) and ω is the sound frequency in hertz. At low frequencies $n_{eff}$, the refractive index, increases. Hence at lower frequencies a wavefront will be more impacted by the invention.

Sound channels may be pipe shaped (even if not round,) have a semi-conical shape (wherein two sides widen,) be conical (widening on all sides,) semi-exponential (wherein two sides widen at an increasing rate,) or exponential (wherein all sides widen at an increasing rate.)

Sirens typically operate between 1 kHz and 4 kHz. Exponential sound channels have superior performance at lower frequencies, especially below 1.2 kHz. Exponential sound channels have excellent acoustical impedance at the sound entrance end, minimizing acoustic energy loss. But they have poor directional control.

Conical and semi-conical sound channels give a more uniform sound field over a wider bandwidth with better control of directivity. Below 1.2 kHz their efficiency drops. Conical shapes are easier to combine.

One embodiment has both sound channels that are semi-exponential and sound channels that are conical and/or semi-conical in the same framework.

The macroscopic metamaterial structures within sound channels create the effect of connecting a series of channels, which generates the output of an exponential channel.

Figure 2:
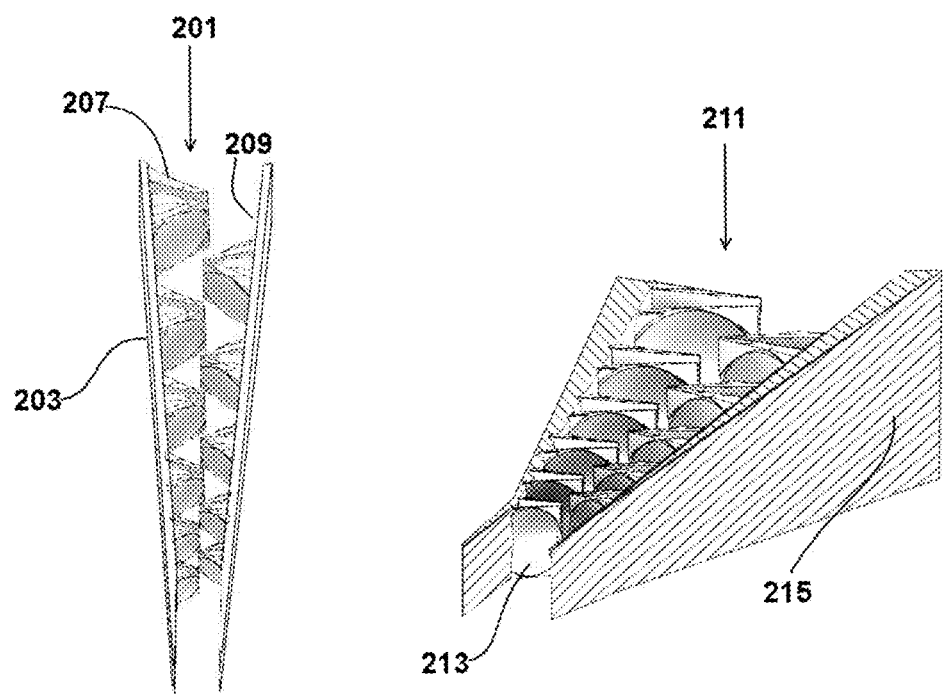
FIG. 2 illustrates sound channels.

FIG. 2 illustration 201 depicts a sound channel which has a coiling coefficient of about 1.57. The amount over 1 represents the extra distance that acoustic energy must travel, compared with the straight distance of channel's length. The channel length in this embodiment is approximately 2 feet. This minimizes the influence of frequency. The wavelet will take at least half again as much time to transmit the channel than if it was on a straight path.

Macroscopic metamaterial structures 207 are parabolic shaped. In this embodiment they are composed of a thin surface of low sound velocity material, below which is a thicker section of high sound velocity material. No acoustic energy penetrates into the unless it strikes at a narrow angle of incidence, which is largely prevented by the's orientation in the sound channel. Given an aluminum substrate with rubber or silicone surface, the critical angle is about tan 0.05, or 3 degrees. Only a small fraction of scattered acoustic energy will be absorbed.

Macroscopic metamaterial structures have concave surfaces with tilted angle α, with a reflection phase 1 due to a, relative to the axis x, which is perpendicular to the wavefront axis focal line f. The reflection phase expresses, for a given macroscopic metamaterial structure orientation, the extent to which the wavelet is delayed relative to the pre-transmission wavefront. Axis x reflects acoustic energy, rather than propagating it. Axis x' indicates the acoustic energy propagation direction with tilted angle α. The equation for this, with λ as the wavelength and lf as the length off is:

$$\Phi(x') = \frac{2\pi}{\lambda}\left(\sqrt{(x'\cos\alpha)^2 + (x'\sin\alpha + lf)^2} - lf + x'\sin\alpha\right) \quad \text{equation 1}$$

At wavelengths between 1 kHz and 4 kHz, acoustic energy is reflected along the channel, maximizing energy transmission. Φ(x') is far from the metamaterial critical angle. The inside face 209 of side walls 203 and 215 may also be composed of a metamaterial, but with different attributes than macroscopic metamaterial structures. Acoustic energy strikes side walls at oblique angles.

Referring to illustration 211, macroscopic metamaterial structures 213 can be seen as sectioning elements that propagate acoustic energy effectively. Side walls 215 are conical vertically, and spread apart along the length of the sound channel. Acoustic energy conforms to the sound channel. In this embodiment, side walls 215 become thicker nearer to the sound output end, reaching a thickness of 10 mm or more. This reduces the quasi-coupling loss generated by the larger macroscopic metamaterial structures.

Figure 3:
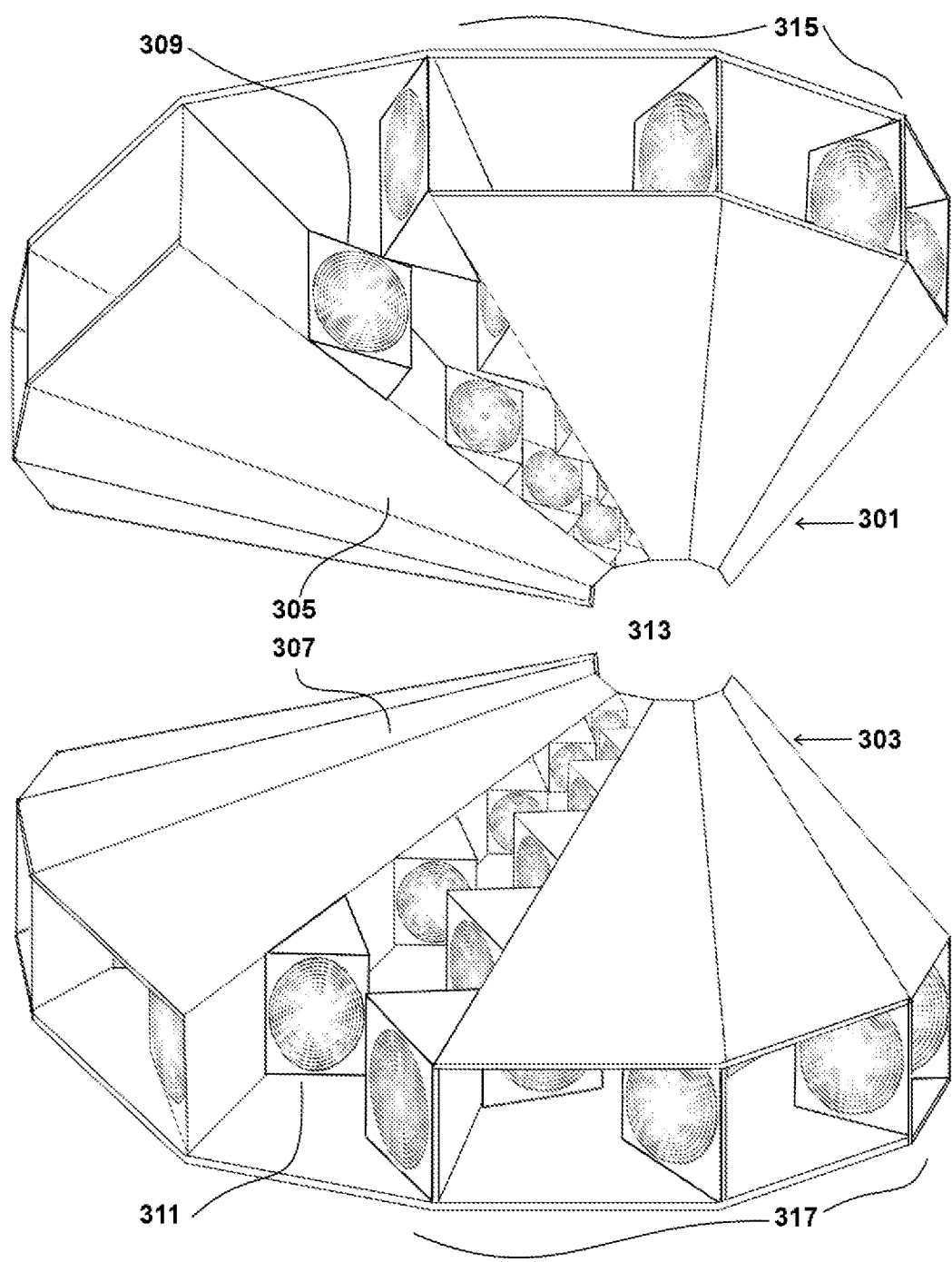
FIG. 3 is a cut-away perspective drawing of sound frames.

FIG. 3 is a cutaway perspective view of two support frames, 301 and 303, each containing multiple sound channels 305 and 307, each sound channel with multiple macroscopic metamaterial structures 309 and 311. 301 and 303 are lower and upper support frame members of a single framework, with the other intermediate support frame members not visible. The framework is scaled to intersect an entire acoustic wavefront at 313. macroscopic metamaterial structures 309 and 311 are preferably molded to have rigid contours, and are spaced and oriented according to equation 1. Support frames 301 and 303 are open at sound input end 313 and sound exit ends 315 and 317. Cutaway portions show the distribution of macroscopic metamaterial structures 309 and 311.

Figure 4:
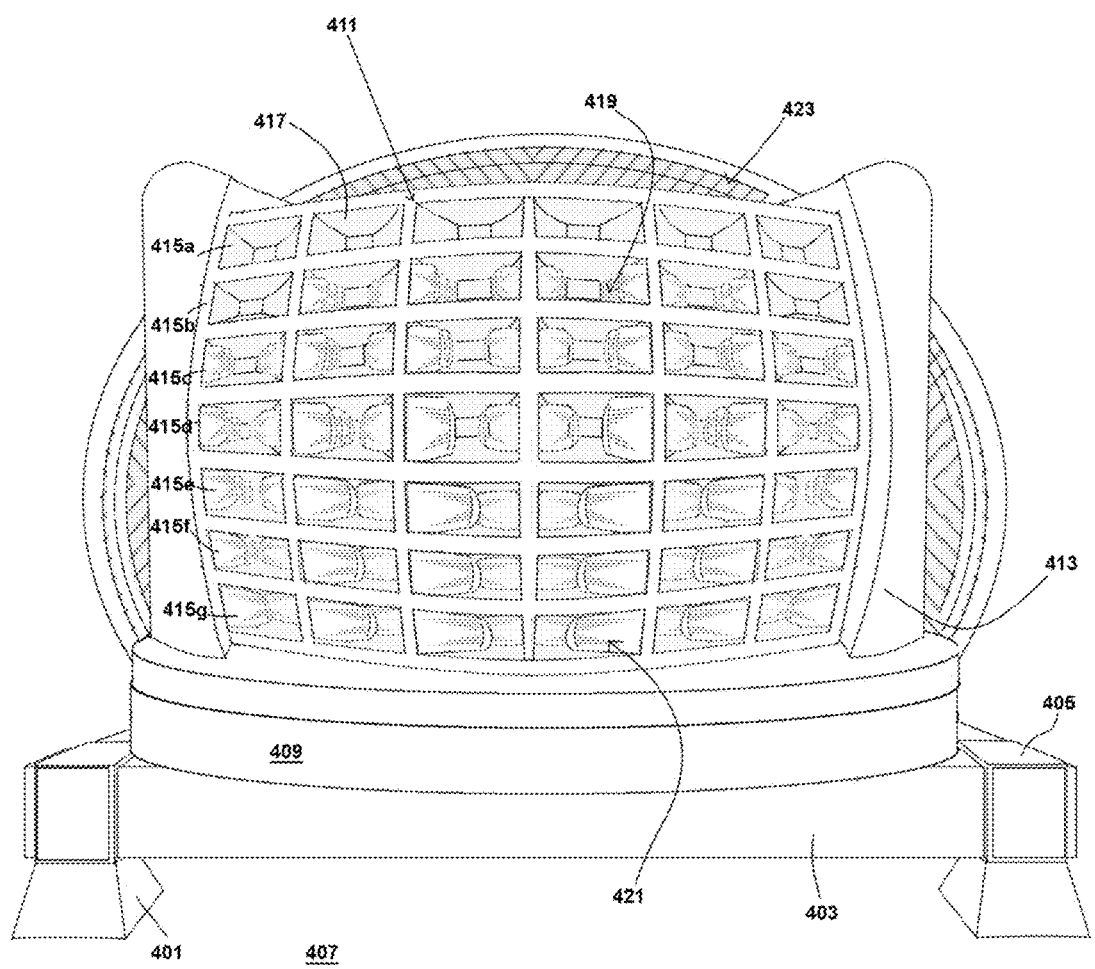
FIG. 4 is a perspective view of a sound framework configured with a sound emitting horn.

FIG. 4 is a perspective illustration of a sound directing framework 411 mounted in front of emergency siren 423, positioned on the external roof 407 of a vehicle. It includes footing members 401, which may have suction elements beneath, mountable to vehicle roof 407, with beams 403 extending between them, which are rigidly secured in braces 405 on each footing 401. It will be appreciated that there are a number of possible methods for attaching the sound directing framework to vehicle roof 407.

Foundation pad 409 may comprise a platform that is attached to the top surface of beams 403, and spans the length and width of the sound directing framework 411. Pillars 413 protect and support the seven horizontal frames 415a through 415g that comprise framework 411. Each frame in the 415 series comprises six sound channels such as 417, and each sound channel contains macroscopic metamaterial structures such as 419 and 421, which vary in size and orientation.

This ensemble is mounted in front of an emergency siren 423, configured to cover the siren's horn.

Figure 5:
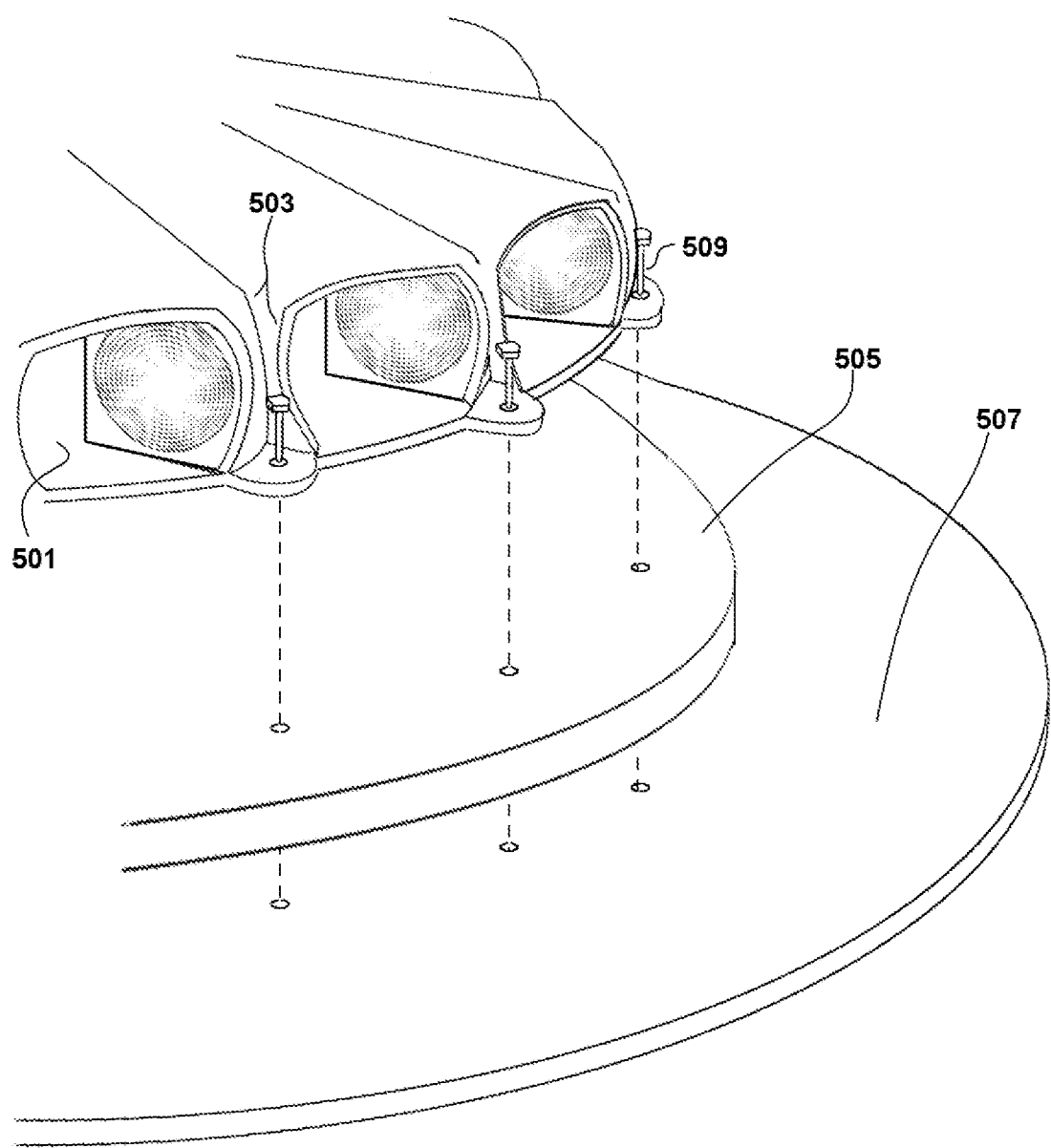
FIG. 5 illustrates a sound frame with sound exit end extensions.

FIG. 5 illustrates the sound output end of sound channels 501, which in this embodiment include extension members 505 and 507, surfaces which control acoustic energy so that it does not rebound or deviate. The illustrated extension members 505 and 507 are generally plastic extrusions or injection molded parts. As one of ordinary skill in the art will readily recognize, in other embodiments each extension member may be constructed from different material. The positional relationship between sound channels 501 and extension members 505 and 507 are arbitrary and are preferably selected to minimize any air flow losses. Sound channels 501 are defined by housing 503 which is coupled to extension members 505 and 507 with self threading screws 509. Sound channels 503 are shown with a semi-conical form in FIG. 5. As one of ordinary skill in the art will readily recognize, other forms may be employed. The alternative form may depend, for example, on the cross-sectional shape of the sound channel housing 503.

Figure 6:
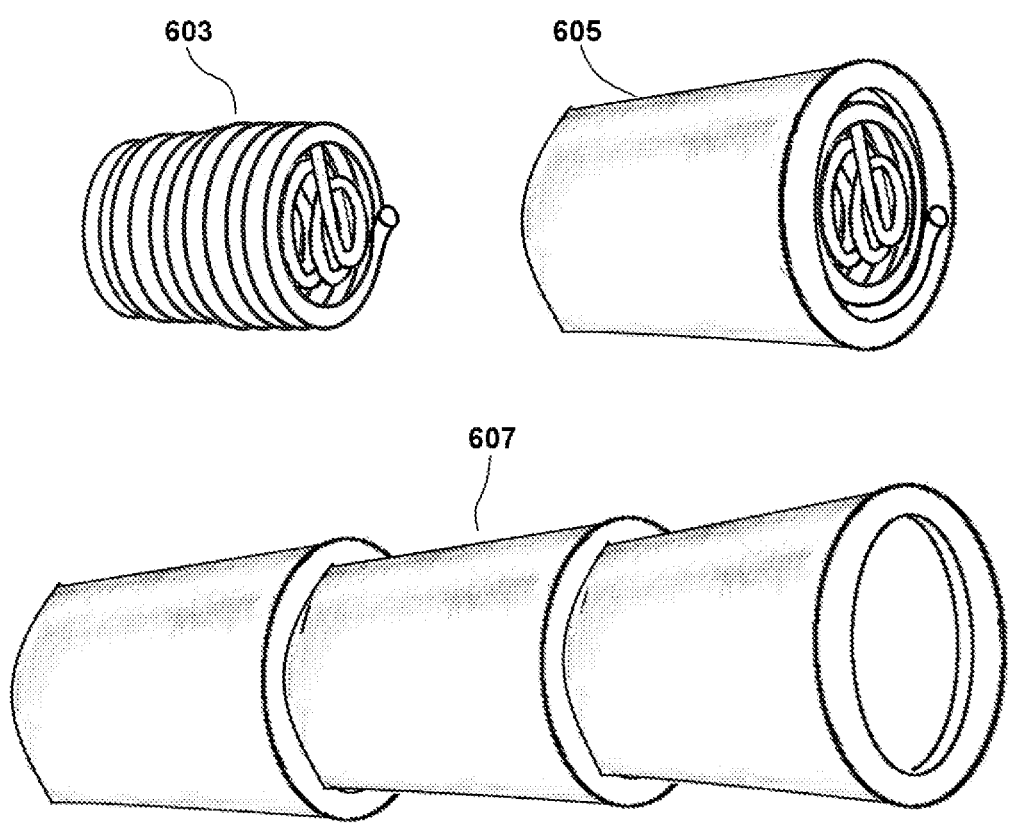
FIG. 6 is a perspective view of spiral-based acoustic macroscopic metamaterial structures.

FIG. 6 presents different views of spiral-based acoustic energy. FIG. 6 presents different views of spiral-based acoustic energy macroscopic metamaterial structures. Spiral wound tubes 603 are encapsulated in solid material 605. These are joined flexibly in a parallel orientation with one another, as in 607. A desired directional input modification features a spiral winding which corresponds to an acoustic transmission function. In equation 2, transmission duration 24 corresponds to the spiral winding $K_w$ (radians per meter) over spiral distance x:

$$u(K_w, x) = U_o(K_w)e^{-jk(\omega)\cdot x} \quad \text{equation 2}$$

$U_o$ defines the initial velocity of a wavelet, modified by winding ($K_w$) which is characterized by a wavefront propagation exponent (cos $\Theta i_1$+sin $\Theta i_2$), the sinusoidal angles generated by a given spiral winding, and the distance of the spiral tubes x.

Figure 7:
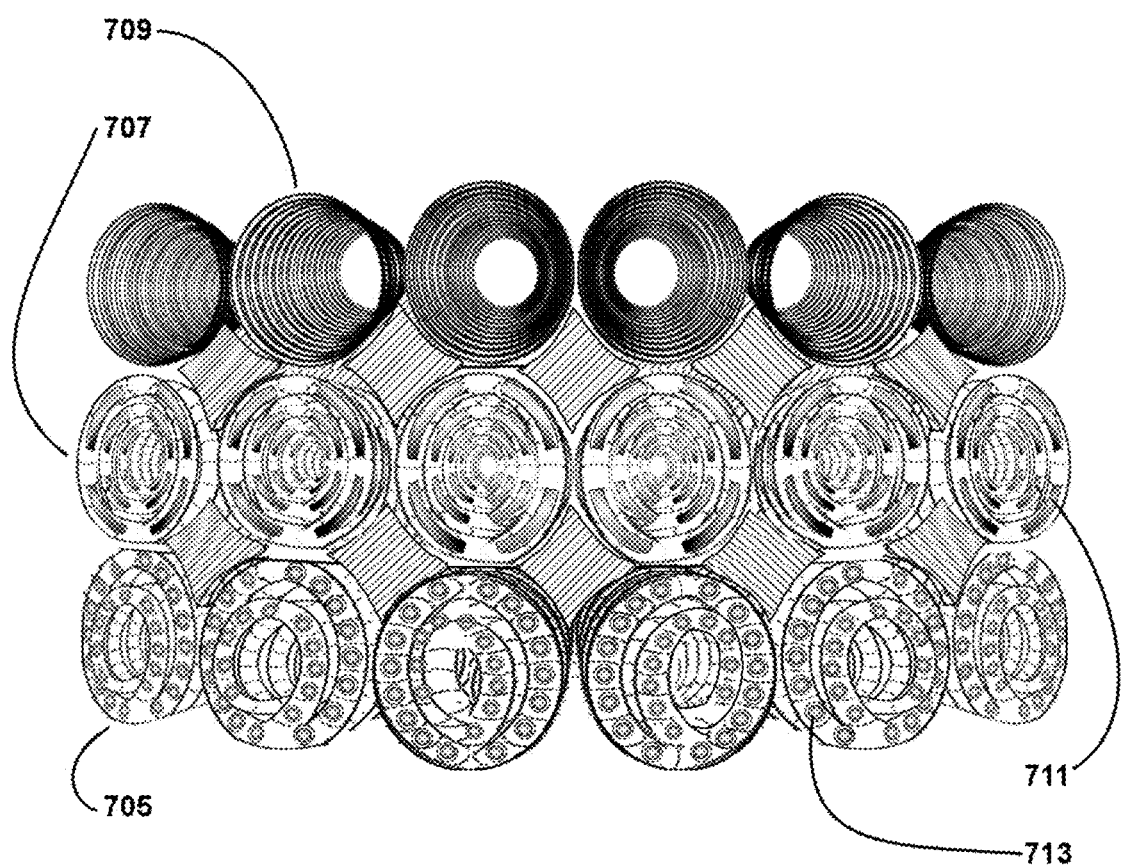
FIG. 7 is a perspective view of spiral-based acoustic macroscopic metamaterial structures in frames.

FIG. 7 is a perspective view of an embodiment of spiral-based macroscopic metamaterial structures, in this case showing the winding configurations that vary by frame level. Lowest level 705 contains macroscopic metamaterial structures with maximum winding that delay transmission the most. Top level 709 contains macroscopic metamaterial structures that permit acoustic energy transmission without delay. Middle level 707 contains macroscopic metamaterial structures that are between maximum and minimum.

The maximum and minimum values of the wavelet transmission durations, $u_{min}$ and $u_{max}$, essentially define the shape of the post-transmission wavefront. Spiral tubes are expanded radially outward and lengthened in each successive macroscopic metamaterial structure. By increasing the radius of the windings of the spiral tubes, the acoustic energy they transmit is allowed to expand at a smooth rate. Restricted flows are generally avoided and sound amplitude is not limited. Referring to frame 707, grooves 711 are cut into the sides of the last spiral tubes, to allow for acoustic energy transmission outward. Similarly the last spirals of frame 705 have apertures 713 to permit acoustic transmission.

Figure 8:
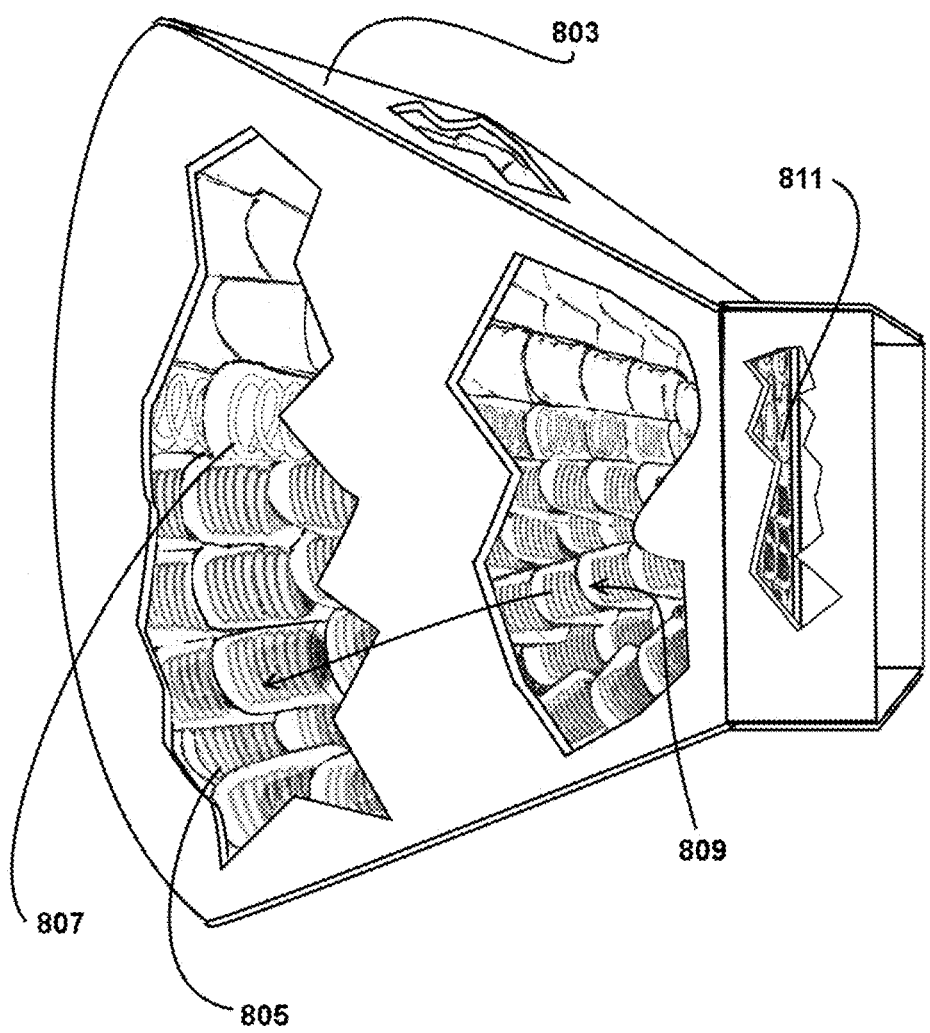
FIG. 8 is a perspective view of a complete framework of spiral-based acoustic macroscopic metamaterial structures.

FIG. 8 is a perspective view of a spiral-based framework fully encased in shell 803, for placement directly in front of a sound horn, with cut-away areas revealing spiral macroscopic metamaterial structures. The contents of the encased framework contains a plurality of spiral-based macroscopic metamaterial structures that decrease winding dimension with elevation. 805 has a higher winding dimension than 807. Spiral elements with similar winding dimensions are configured together in mutually parallel horizontal planes to form an expanding transmission path, as 809 displays. These paths are disposed with longitudinal side walls disposed tightly against neighboring paths, preferably with soft walls that permit them to squeeze together. Each spiral-based macroscopic metamaterial structure has front openings that provide notches or recessed edges that fit into corresponding elements on the rear openings of the next spiral-based macroscopic metamaterial structure, forming the contiguous transmission path. In the assembled structure, each sound entrance opening of each transmission path is secured in place in wavefront divider 811.

Figure 9A:
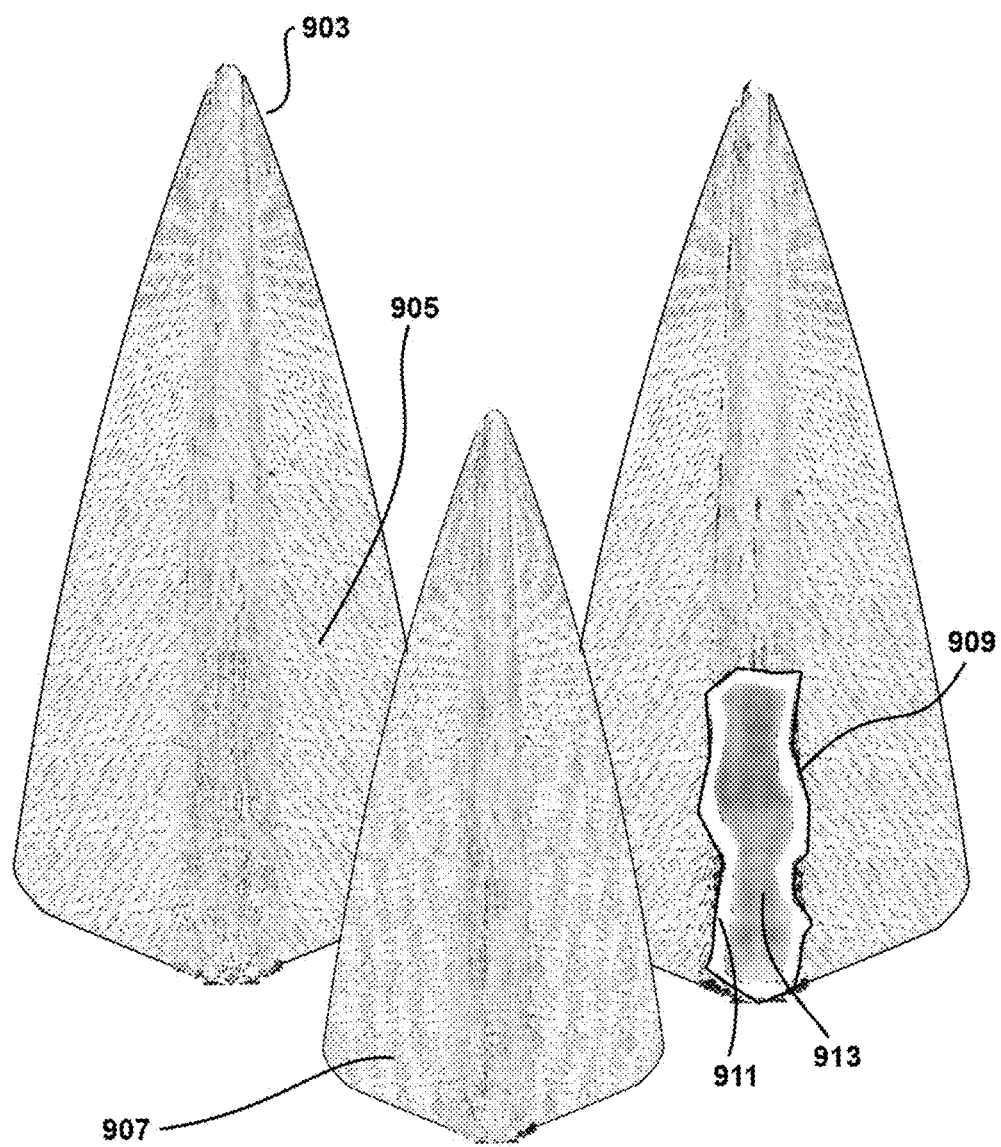
FIG. 9a illustrates pillar macroscopic metamaterial structures.

FIG. 9a displays composite macroscopic metamaterial structure pillars that variably modify acoustic energy, principally by what height of a pillar intersects the energy. At a pillar's top, such as 903, the pillar is narrowest, permitting acoustic energy transmission with hardly any barrier, which corresponds to the $u_{min}$ minimum transmission duration. At a pillar's vertical midsection, such as 905, the surface area is greater and oriented deeper, similar to the illustrated in FIG. 4 415d. At a pillar's lowest area, such as 907, the surface area is largest and of greatest depth, which corresponds to the $u_{max}$ maximum transmission duration.

The surface of each pillar in this embodiment is composed of two or materials, which together generate an acoustic refraction index. Cutaway 909 illustrates this, with a thin surface material such as silicone 911 over a dense material such as aluminum 913. These are designed with reference to likely sound frequency range and sound angle given the position of each pillar relative to the sound horn. Use of pillars of the particular kind disclosed in this embodiment gives particular advantage in terms of maximizing the acoustic energy transmitted.

Figure 9B:
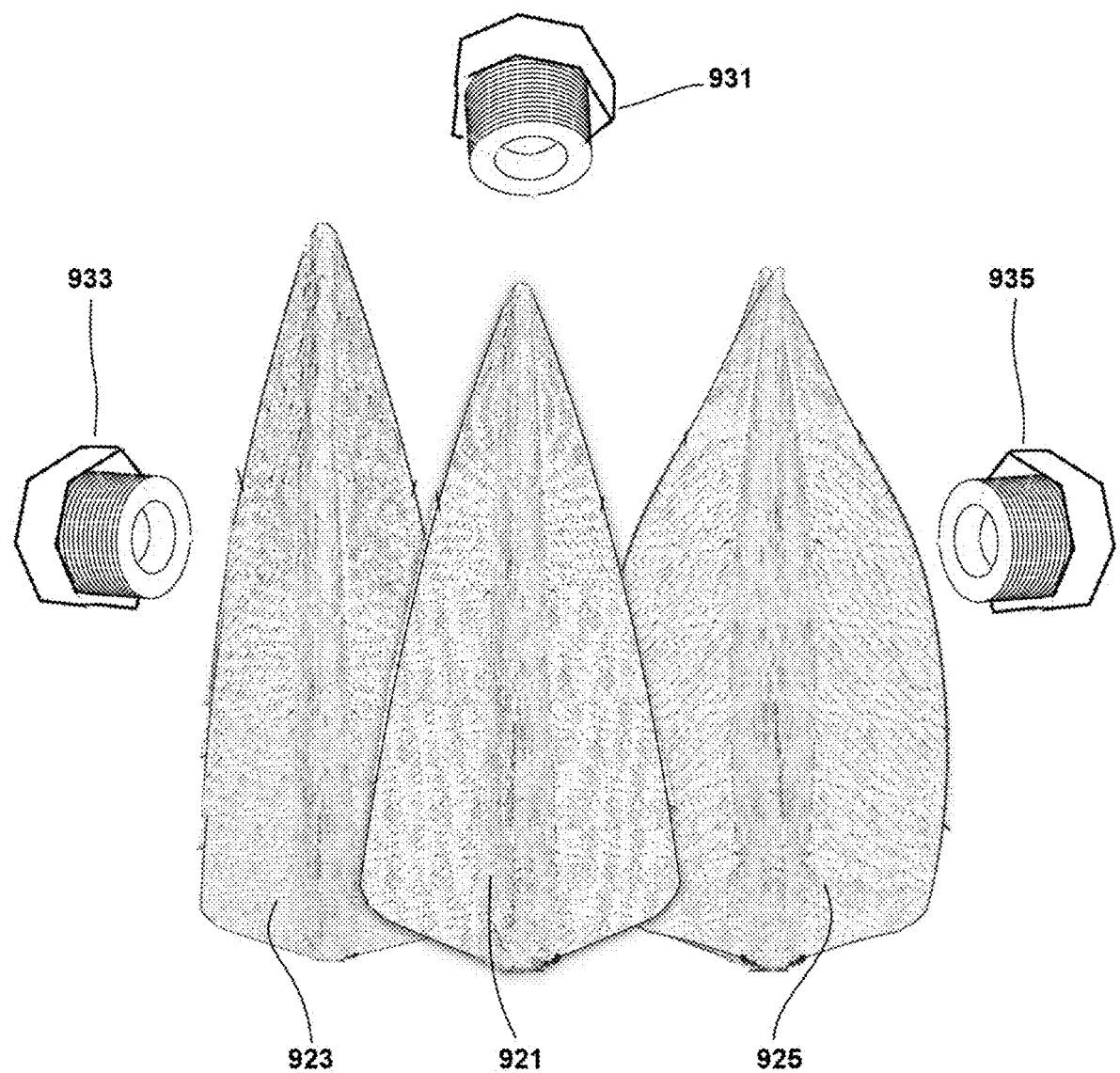
FIG. 9b illustrates flexible pillar macroscopic metamaterial structures.

FIG. 9b displays the same pillar style, but with a different material basis and performance. Three states of the same pillar are displayed. In this embodiment, a pillar such as 921 can change shape, becoming narrower, taller and deeper as in version 923, or wider and shallower as in 925. This changing configuration pulses to coincide with sound frequency changes. For example, an emergency siren may alternate between a lower frequency 1 MhZ tone and a higher frequency 4 MhZ tone. The lower frequency sound is better managed with the taller, deeper pillar 923, and the higher frequency is better managed with the wider pillar 925.

In this embodiment each macroscopic metamaterial structure is composed of stretchable materials. Given pillar 923 is about 14 cm tall by 7 cm wide, the flexible macroscopic metamaterial structure is manufactured with a metallic core roughly half that size. Onto this is attached a low viscosity, soft, strong and very "stretchy" rubber, such as Ecoflex. The rubber has ferromagnetic microparticles distributed in it, concentrated on the pillar's different axis. An electromagnetic coil system distributes electromagnetic coils such as 931 around the circumference of the framework. These generate actuating fields according to programmed operations. When coils to the sides of pillars 933 and 935 generate fields, the pillars stretch sideways. When coils above the pillars 931 generate fields, the pillars stretch vertically. Various pillar shapes can be programmed this way.

The programmed changing shapes of pillars corresponds to the programmed emergency siren frequency shifts.

Figure 10:
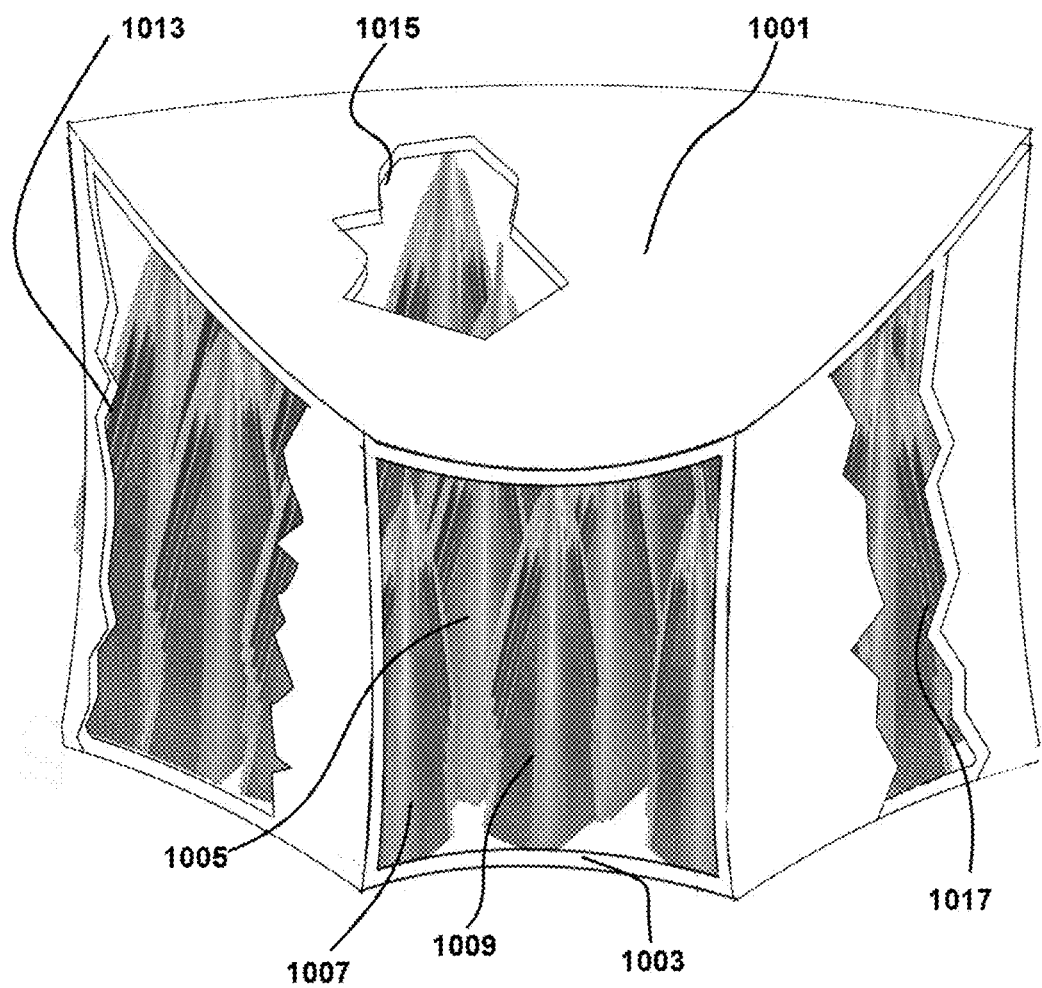
FIG. 10 is a perspective view of a complete framework of pillar macroscopic metamaterial structures.

FIG. 10 is a framework composed of a plurality of vertical pillar macroscopic metamaterial structures assembled to form a series of paths, visible in cutaway areas 1013, 1015, and 1017, extending through an enclosed structure 1001 in both horizontal and vertical planes. The pillars at the sound entrance end 1003 intersect the pre-transmission wavefront, which diverges into acoustic paths that flow around the pillars. Each successive pillar in the framework, such as 1005, in the direction of the sound exit end, is disposed alternately between two neighboring smaller pillars, such as 1007 and 1009, towards the sound entrance end. Acoustic energy wanders more between the lower area of pillars than higher up.

Figure 11:
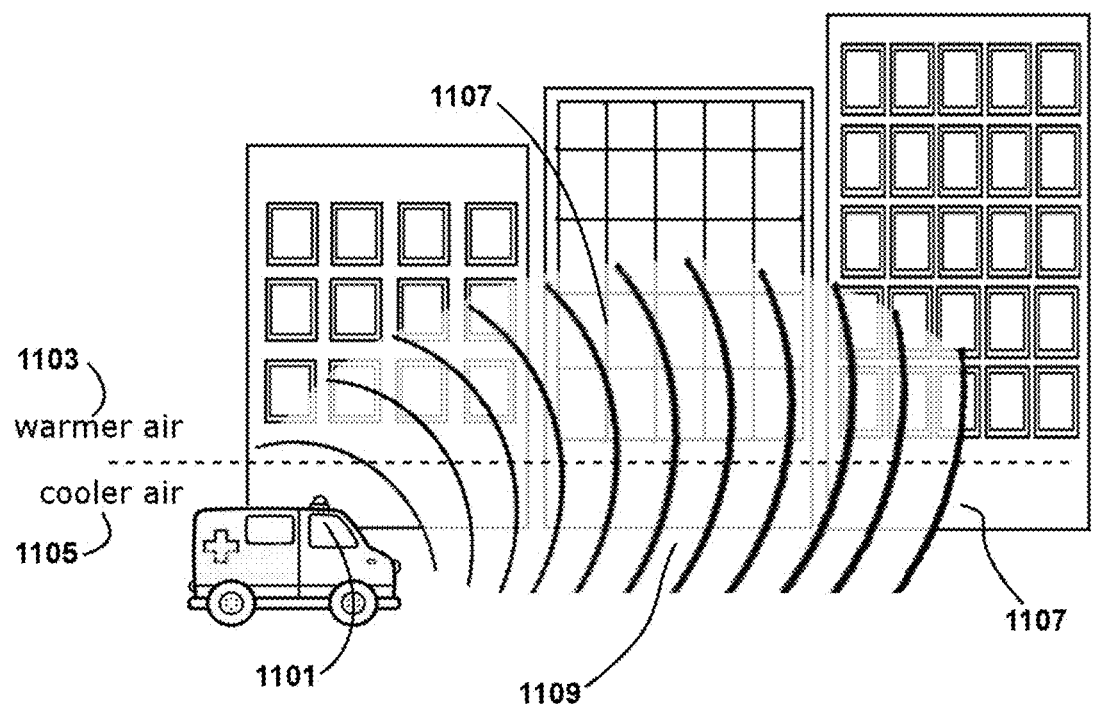
FIG. 11 is a schematic view of how temperature inversions modify acoustic wavefronts.

FIG. 11 shows the scientific basis of another embodiment. Acoustic energy velocity is modified by the temperature of the medium, with a wavefront moving at higher velocity at higher temperatures, and lower velocity at cooler temperatures. When parts of an acoustic wavefront, or wavelets, travel through different layers of a medium that are at different temperatures, they travel at different velocities, which changes the propagation direction of the entire wavefront.

FIG. 11 illustrates a city street in which a layer of warmer air 1103 lies above a layer of cooler air, 1005, which occurs during a temperature inversion. The upper part of wavefront 1107, emitted by emergency vehicle 1101, moves faster in the warmer air than the lower part of the wavefront 1109, which moves slower in the cooler air. The entire wavefront 1111 bends forwards toward the ground. This can extend the range of a wavefront, while preventing it from reaching higher elevations.

Figure 12:
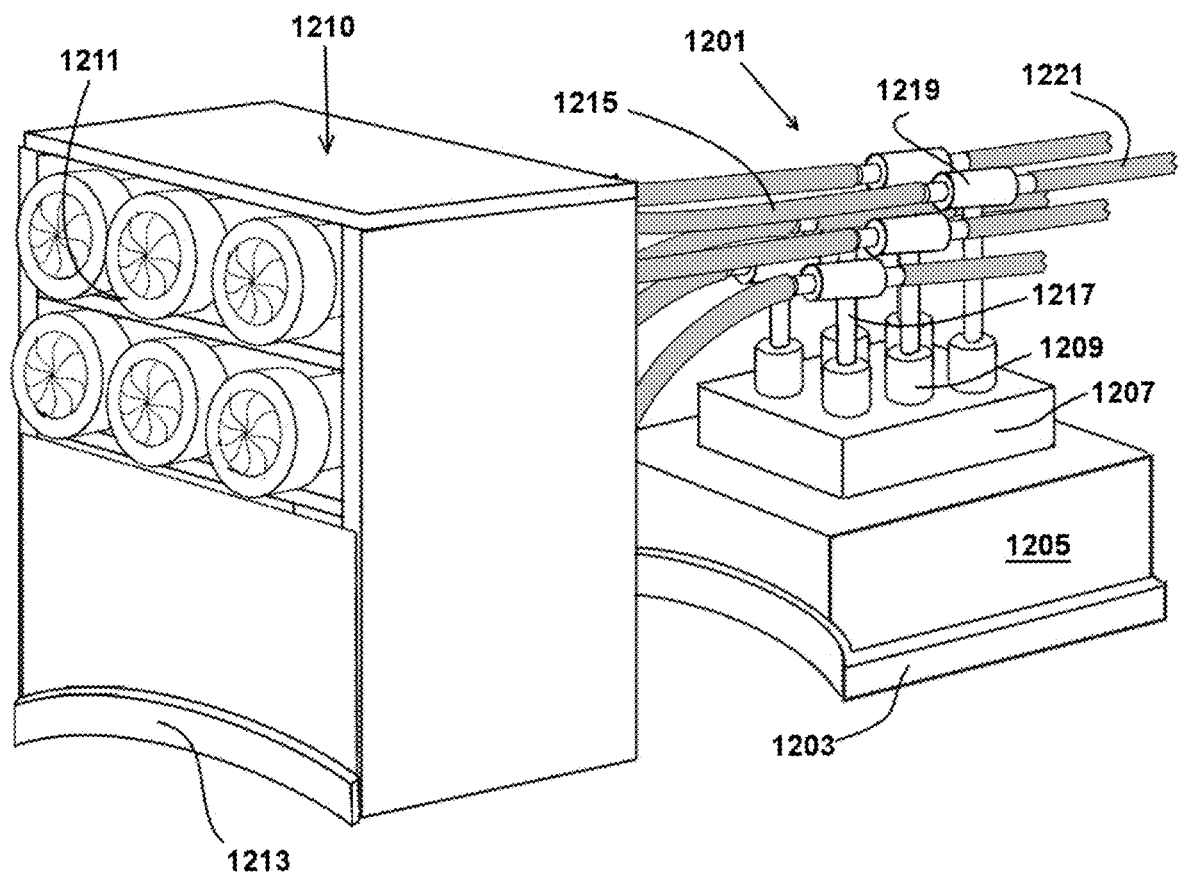
FIG. 12 is a perspective view of a fan system and heat exchanger.

FIG. 12 illustrates a heat exchanger 1201 that includes a base 1203 and a heat chamber 1205. The base 1203 preferably has a curved edge for fitting to the vehicle. Also shown is the fan set 1210, which contains fans 1211 that blow air through tubes 1215. The fan set base 1213 preferably has a curved edge for fitting to the vehicle. In this embodiment heat exchanger 1201 has a rectangular shape, but one skilled in the art can see that any shape may be utilized. Heat exchanger 1201 heats air with heating elements contained in the heat chamber 1205. Heated air is drawn to the top of the heat chamber 1205, where it feeds into a container 1207 which contains a manifold that partitions the heated air into compartments 1209 with different temperatures. Air in each compartment rises into risers 1217, which connect to junction 1219, where the heated air is blown into hose units 1221 with the fan-driven air in tubes 1215.

A fan set such as 1211 can also be used in conjunction with frameworks that contain sound channels and macroscopic metamaterial structures, in which moving air is used to prevent acoustic energy from degrading in eddies and backflows. Heated or cooled air can also be used in conjunction with any other configuration, such as with sound channels with macroscopic metamaterial structures.

Figure 13:
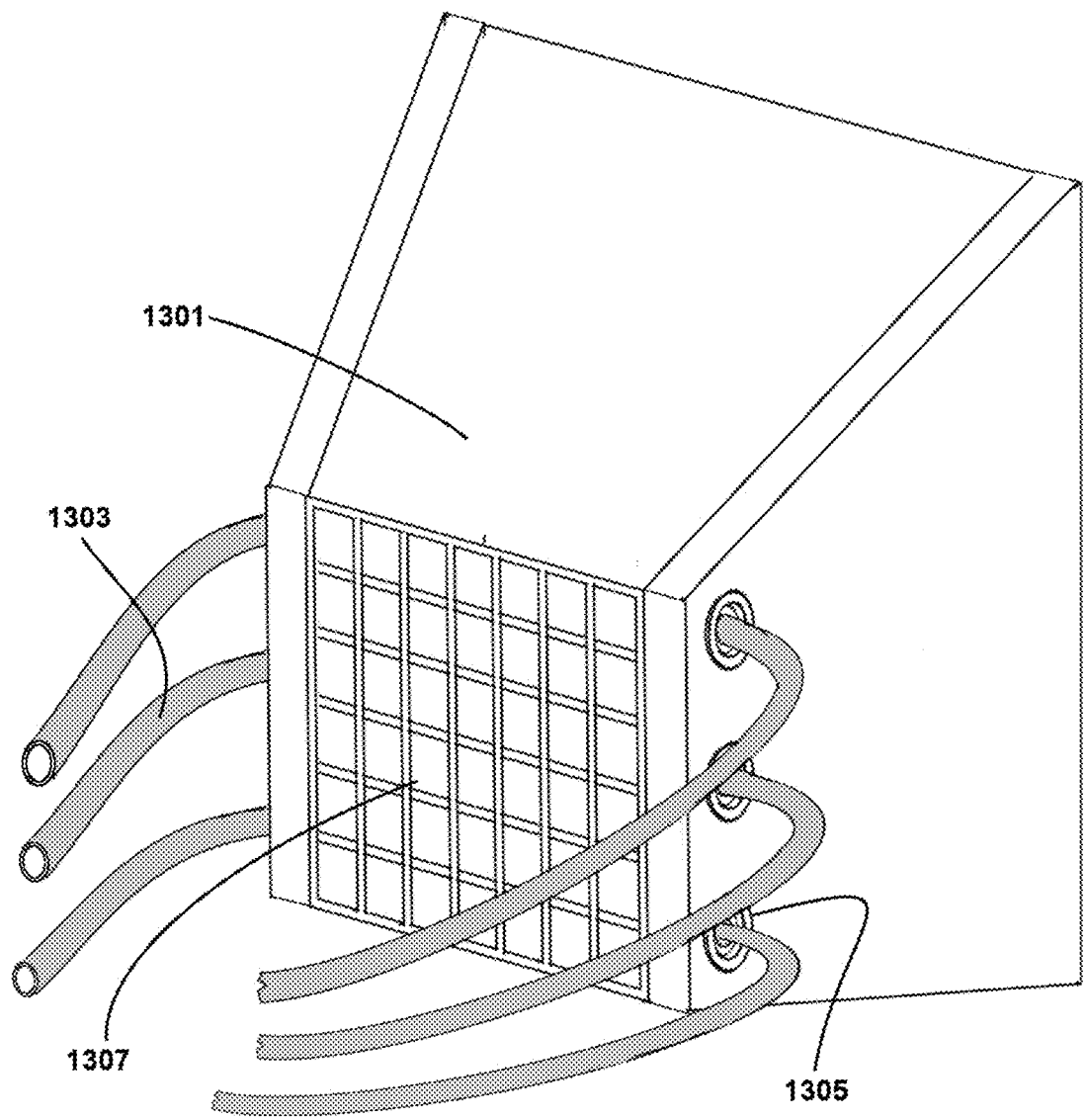
FIG. 13 is a perspective view of a complete framework with forced air inputs.

FIG. 13 illustrates a sound framework 1301 in which heated or cooled air in air lines 1303 is forced through vents 1305 which connect to passageways inside the framework, where the air is moved to different sound channels 1307. The mechanism that heats and cools air uses temperature gauges to maintain target temperatures. Air flow velocity is maintained by the fans 1211 in FIG. 12.

Figure 14:
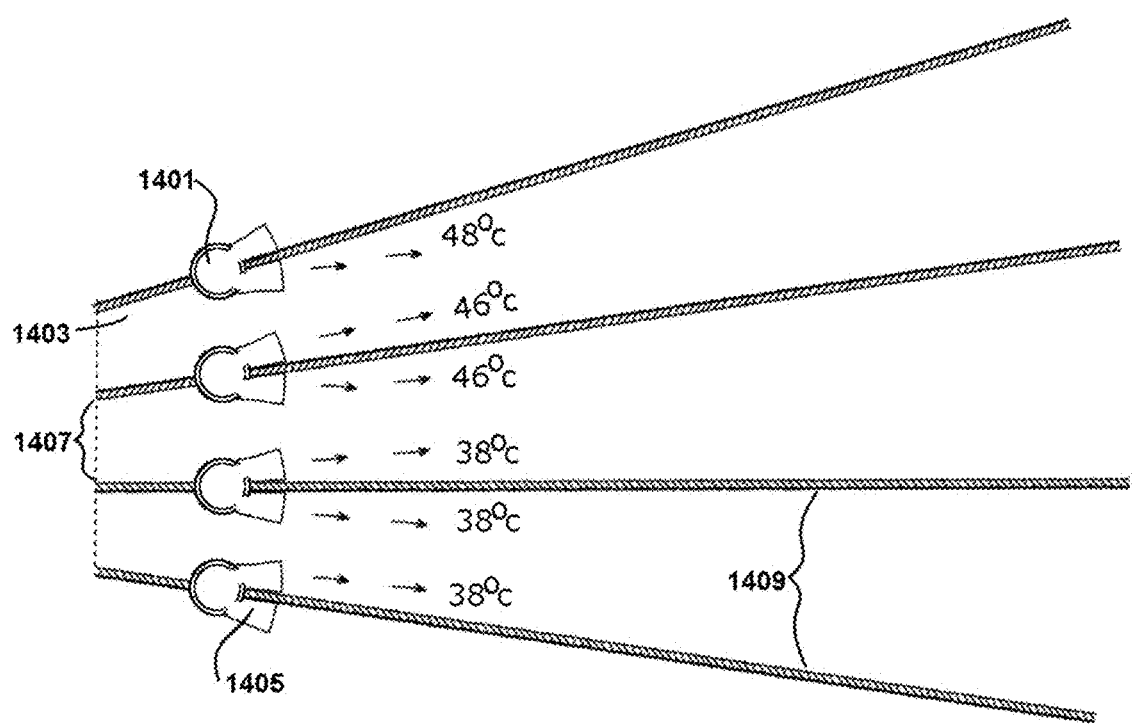
FIG. 14 is a schematic view of a temperature altering force air configuration in sound channels.

FIG. 14 is a schematic representation of sound channels that have forced air flowing in them. Air heated or cooled to different temperatures is forced into pipes 1401 that are positioned across channels such as 1403. In this embodiment the opening width and height of each channel 1407 is about 17 mm, and cross section about 290 mm$^2$, with slopes 1409 of upper and lower channel surfaces diverging at about 8.5 degrees over a length of about 0.5 m. The heating fans can inject 100 to 200 CFM of air into a channel, depending on the extent of temperature change required.

The distribution of modified temperature air comes from the main vent all along pipes through multiple points of exit. These have a shape like a funnel, such as 1405. Other shape variations can be used. Also, in channels in which the wavelet transmission duration is lengthened, air funnels may be positioned near the sound exit end of channels, with air flow directed towards the sound entrance end. The physical air flow will reduce acoustic energy velocity, as well as temperature.

Figure 15:
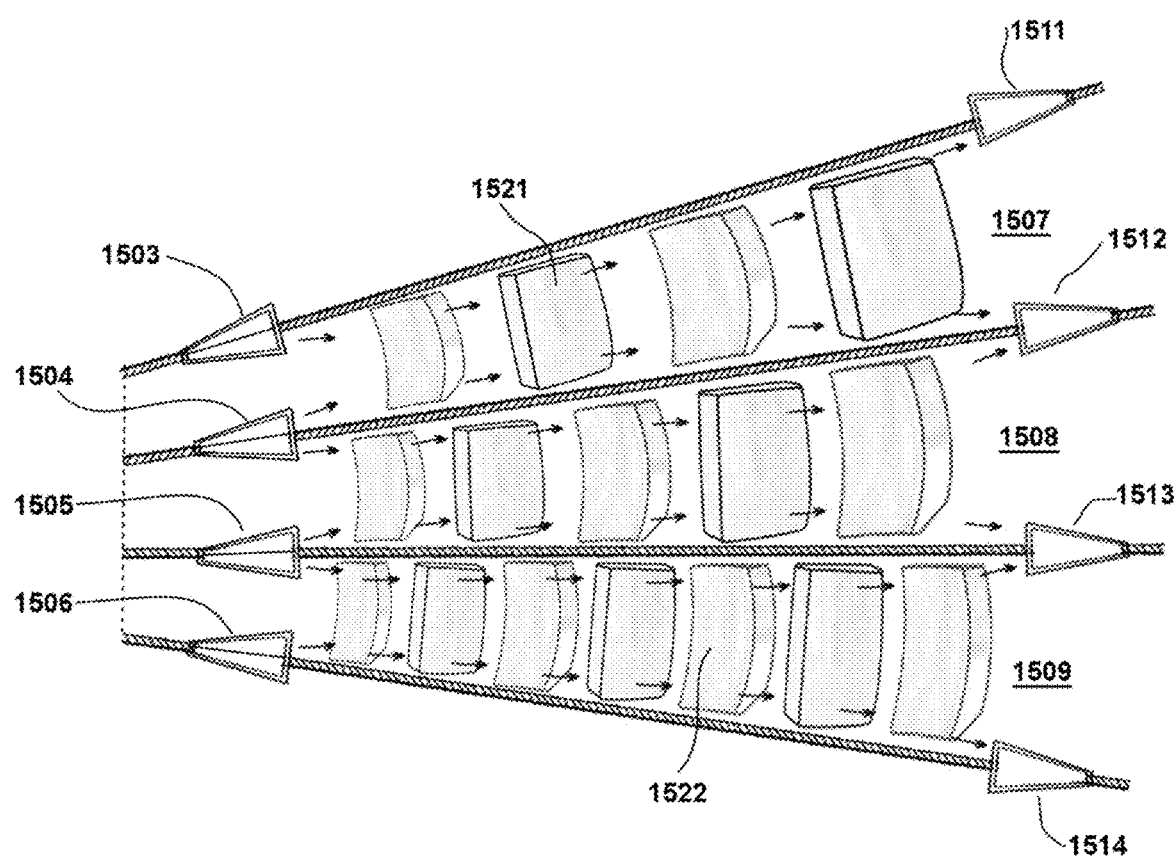
FIG. 15 is a schematic view of a friction reducing forced air configuration in sound channels.

FIG. 15 illustrates an embodiment that combines macroscopic metamaterial structures and forced air flow in sound channels. In this embodiment all the air flow is in the direction of the sound exit ends. The pipes 1503, 1504, 1505 and 1506 that extend across channels 1507, 1508, and 1509, are themselves funnel shaped, and open within each individual channel. These pipes push air out into the channels. Pipes 1511, 1512, 1513, and 1514 extend across the channels at the sound exit end, and their funnels open facing inwards. These pipes pull air out of the channels. Air flows are represented by arrows.

Macroscopic metamaterial structures like 1521 and 1523 are shaped and oriented to optimally permit acoustic energy to flow around them. However there will always be some reflected energy, and eddies and backscattered energy, that reduce sound amplitude. The forced air currents produced by pipes that push and pipes that pull air through the channels eliminates chaotic energy formation, preventing diminished amplitude.

Forced air currents are modulated to optimize acoustic energy flow, but not overwhelm it. If air currents are too strong, they could cancel the effect of forcing acoustic energy to meander around macroscopic metamaterial structures.

Figure 16:
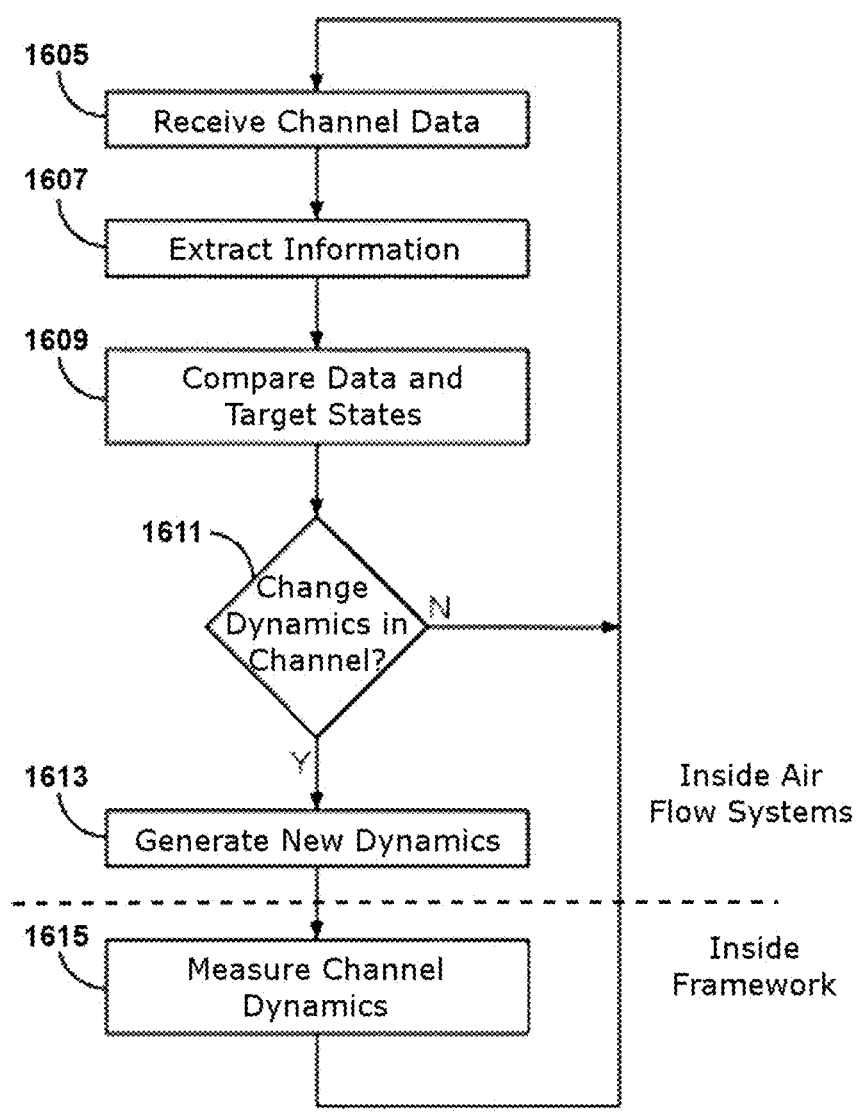
FIG. 16 is a flow-chart description of a forced air and temperature altering system for sound channels.

FIG. 16 is a flowchart of an example process that may be executed by a sound framework such as the embodiment illustrated in FIG. 15, to maintain sound channel dynamics regardless of external conditions.

At block 1605, the air change system may receive data from one or more sound channels. Sensors may be incorporated into the sound channel interior, be attached to the channel's sound exit orifice, etc. The data may be received via a signal transmission and is passed to a processor.

At block 1607, the processor may extract information from the channel data. The processor may, for example, extract the phase of sound waves exiting the channel, which may indicate that the transmission duration of acoustic energy in the channel is too fast or slow. The processor may only consider the dynamics of each sound channel, or may compare each sound channel to other sound channels, as environmental conditions may alter them all.

At block 1609 the processor may determine an offset between sound channel performance and a target goal. For example, this may show the acoustic energy is transmitted through the channel too quickly or too slowly. That result may be fixed by a change in CFM in the channel, or its temperature.

At decision block 1611, the processor may determine whether to modify fans, heating, or cooling. In one example, if the sound transmission time needs to be accelerated, the processor may determine that a temperature increase is required. This output is sent to block 1613. If the offset between sound channel performance and a target goal is small, the process may proceed to block 1605 to await new data.

If the processor determines change is needed, at block 1613 the fans and/or temperature modification systems change their output. This leads to modification of air dynamics in the sound channel. At block 1615 sensors in, near, or about the sound channel measure acoustic energy dynamics.

The present invention is not limited to the above described embodiments, and it goes without saying that various modifications can be made without departing from the scope of the invention. For example, in the above described embodiments, the apparatus are mounted in vehicles such as ambulances have been shown; however the present invention is not limited thereto, but can be employed in any vehicle in which directed sound waves are desired. This may be especially useful for motorcycles, which could use directed sound to warn vehicles of their presence.

Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

The invention claimed is:

1. A device for directing sound, comprising:
   a framework adjacently disposed to, and acoustically coupled to, a horn or a cone of a sound generator emitting a plurality of acoustic wavefronts, comprising:

a plurality of support frames; and
at least one of the plurality of support frames configured with a plurality of sound channels, each sound channel comprising:
a sound entrance end and a sound exit end, the two ends sharing a common axis; and
at least one acoustic macroscopic metamaterial structure, each having a predetermined shape and orientation, disposed between the ends;
each one of the plurality of acoustic wavefronts, being emitted by the sound generator with a generally positive Gaussian curvature, is partitioned into a plurality of wavelets at the sound entrance ends of the sound channels;
each one of the plurality of wavelet's transverse dimensions conforming substantially in shape to a cross-sectional area of each corresponding one of the plurality of sound channels;
each one of the plurality of sound channels transmitting the corresponding wavelet between the sound entrance and sound exit end for a predetermined duration; and
at least one of the plurality of sound channels transmits wavelets for the duration that is different from at least one other sound channel's transmission duration, causing at least one shape modification of the acoustic wavefront.

2. The sound directing system of claim 1, wherein the plurality of sound channels partitions the acoustic wavefront through a plurality of orifices, each orifice corresponding to a respective one of the plurality of sound channel's sound entrance ends.

3. The sound directing system of claim 2, wherein at least one of the plurality of orifices are cut out of a solid planar surface in a shape selected from the group of patterns consisting of zig-zag patterns, random patterns, and geometric patterns.

4. The sound directing system of claim 1, wherein at least one of the plurality of wavelets passes through a respective one of the plurality of sound exits into a sound exit area configured with an extension plane extending outward in a direction substantially parallel to a longitudinally extending axis of the one of the plurality of sound channels associated with the respective sound exit.

5. The sound directing system of claim 1, wherein at least one of the plurality of sound channels contains the at least one macroscopic metamaterial structure configured in a modified concave shape that directs acoustic energy on a substantially indirect path between the sound entrance end and the sound exit end of the at least one sound channel, the modified concave shape minimizing back-scattering and boundary layer separation during the transmission of acoustic energy.

6. The sound directing system of claim 1, wherein the at least one macroscopic metamaterial structure has one or more of the following patterns raised upon and/or removed from some portion of its surface: 1) wave patterns, 2) topographical patterns, 3) geometric patterns; each pattern directs movement of acoustic energy and minimizes back-scattering and boundary layer separation of acoustic energy.

7. The sound directing system of claim 1, wherein one or more of the plurality of sound channels are configured with cavity walls.

8. The sound directing system of claim 1, wherein at least one macroscopic metamaterial structure includes a metamaterial comprising a substrate and surface layer engaged to the substrate;
the substrate and surface layer are composed of different materials;
the different materials transmit sound at substantially different speeds.

9. The sound directing system of claim 1, the framework comprising a single support frame, comprising at least one macroscopic metamaterial structure scaled to intersect the plurality of acoustic wavefronts;
the at least one macroscopic metamaterial structure has an obovate shape, tapering towards the top, and is configured to cause a plurality of acoustic phase shifts.

10. The sound directing system of claim 1, wherein at least one of the macroscopic metamaterial structures is a coiled unit.

11. The sound directing system of claim 1, wherein forced air flow generated externally to the framework is pumped into and/or out of at least one of the plurality of sound channels, thereby facilitating vortex shredding.

12. The sound directing system of claim 11, further configured with a base unit comprising:
at least one cell comprising a fan system coupled to an electronic device, wherein the fan system is configured with at least one fan;
at least one air hose being coupled to the base unit, comprising:
a first passage in atmospheric communication with the at least one cell and a second passage configured to carry air flow away from the at least one cell to a plurality of pipes within the framework, each one of the plurality of pipes comprising:
a first passage coupled to the at least one air hose and a second passage at least partially disposed in close proximity to at least one of the plurality of sound channels, at least a portion of space between at least one of the plurality of pipes and at least one of the plurality of sound channels forming a connecting aperture;
at least one of the plurality of pipes configured to force air into at least one of the plurality of sound channels.

13. A device for directing sound, comprising:
at least one framework capable of shaping each one of a succession of acoustic wavefronts emitted by a proximal sound generator, the framework comprising one or a plurality of support frames, at least a portion of each of the one or the plurality of support frames configured with at least one sound channel having a sound inlet and a sound outlet;
the at least one sound inlet partitions each one of the successive acoustic wavefronts into a plurality of wavelets, each wavelet's transverse dimensions conforming substantially in shape to a cross-sectional area of a respective one of the at least one sound channels;
at least one temperature modification unit assembly with a temperature modification means for operating at least one chamber mounted proximally to the at least one framework, a plurality of tubes adapted to extend between the at least one chamber and the at least one framework, at least one of the plurality of tubes in operative thermal communication with at least one of the plurality of sound channels;
at least one temperature sensor placed in at least one of the plurality of sound channels, the at least one sensor connected to a controller in the at least one temperature modification unit;
each one of the plurality of sound channels having a predetermined wavelet transmission duration;

calculating a temperature required to produce the predetermined transmission duration for each one of the plurality of sound channels;

the controller adjusting the temperature modification means to modify the temperature in at least one of the plurality of sound channels.

14. The sound directing system of claim 13, wherein the temperature modification means is selected from the group comprising: a compressor-type refrigeration unit, a thermoelectric cooling/heating unit, a heating element with insulating material.

15. A method to change the shape of a wavefront emitted from a sound generator, the method comprising:

partitioning at least a portion of the emitted wavefront with a framework comprising one or more wavelet sound channels;

each wavelet sound channel modifying the apparent velocity of wavelets passing through it;

the modification using one of at least two configurations including:
i) at least one acoustic macroscopic metamaterial that forms a winding or labyrinthine passageway in at least one wavelet sound channel;
ii) a temperature modification assembly that increases or reduces a thermal energy of at least one wavelet sound channel;

changing the shape of the acoustic wavefront.

16. The wavefront shaping method of claim 15, wherein the framework is operatively coupled to receive a plurality of wavefronts emitted from the sound generators;

detecting that at least one of the received wavefronts has a frequency different from the other wavefronts;

changing, in the least one wavelet sound channel, at least one of the configurations that modify the apparent velocity of wavelets passing though it, such that changes in the acoustic frequency do not change the apparent velocity of the corresponding wavelet.

17. The sound directing method of claim 16, the method further comprising:

monitoring an acoustic state;

activating a field that effects a dimensional or shape change in the at least one wavelet sound channel in response to a change in the monitored acoustic state;

wherein the at least one macroscopic metamaterial is a semi-solid material.

18. The sound directing method of claim 15, further configured with the framework positioned in a location selected from the following group of locations: 1) within the sound generator's body, 2) in front of the sound generator's mouth, 3) partially within and partially in front of the sound generator.

* * * * *